US009957907B2

(12) United States Patent
Glugla et al.

(10) Patent No.: US 9,957,907 B2
(45) Date of Patent: May 1, 2018

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US); James Matthew Kindree, South Lyon, MI (US); Lee Benjamin McQuinn, Lenox, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days. days.

(21) Appl. No.: 15/682,840

(22) Filed: Aug. 22, 2017

(65) Prior Publication Data

US 2017/0370311 A1 Dec. 28, 2017

Related U.S. Application Data

(63) Continuation of application No. 14/832,785, filed on Aug. 21, 2015, now Pat. No. 9,759,145.

(51) Int. Cl.

*F02P 5/00* (2006.01)
*F02D 41/00* (2006.01)
*F02D 35/02* (2006.01)

(52) U.S. Cl.

CPC ....... *F02D 41/0087* (2013.01); *F02D 35/027* (2013.01); *F02D 41/0002* (2013.01); *F02D 2200/101* (2013.01); *F02D 2250/14* (2013.01); *Y02T 10/42* (2013.01)

(58) Field of Classification Search

CPC ..... F02D 37/02; F02P 5/04; F02P 5/00; F02P 5/045

USPC ............ 123/406.11, 406.23, 406.29, 406.37, 123/406.47

See application file for complete search history.

(56) References Cited

U.S. PATENT DOCUMENTS

| | | | |
|---|---|---|---|
| 6,338,267 B1 | 1/2002 | Karau | |
| 8,347,852 B2 | 1/2013 | Glugla et al. | |
| 8,627,800 B2 | 1/2014 | Glugla et al. | |
| 8,666,637 B2 | 3/2014 | Glugla et al. | |
| 8,683,976 B2 | 4/2014 | Cunningham et al. | |
| 8,775,055 B2 | 7/2014 | Glugla et al. | |
| 2011/0139118 A1 | 6/2011 | Glugla et al. | |
| 2012/0089315 A1 | 4/2012 | Makino et al. | |
| 2014/0000552 A1* | 1/2014 | Glugla | F02D 43/00 123/295 |
| 2014/0000557 A1* | 1/2014 | Glugla | F02D 41/008 123/435 |
| 2015/0159573 A1 | 6/2015 | Glugla et al. | |
| 2015/0204249 A1* | 7/2015 | Glugla | F02B 37/168 123/90.15 |
| 2016/0215706 A1 | 7/2016 | Glugla | |
| 2017/0051688 A1* | 2/2017 | Glugla | F02D 41/0087 |

* cited by examiner

*Primary Examiner* — John Kwon

(74) *Attorney, Agent, or Firm* — Julia Voutyras; McCoy Russell LLP

(57) ABSTRACT

Methods and systems are provided for improving the detection and mitigation of high speed pre-ignition. In one example, high speed pre-ignition is detected based on concurrent or sequential changes in an integrated knock sensor output in a knock window as well as a pre-ignition window. The high speed pre-ignition is addressed using cylinder fuel deactivation and/or engine load limiting to reduce the risk for run-away pre-ignition.

16 Claims, 10 Drawing Sheets

12
ROM
CPU
RAM
KAM
I/O
PP
EGO
MAF
TP
MAP
DRIVER
PIP
FPW
ECT
SA
FUEL SYSTEM
IGNITION SYSTEM

METHOD AND SYSTEM FOR PRE-IGNITION CONTROL

CROSS REFERENCE TO RELATED APPLICATION

The present application is a continuation of U.S. patent application Ser. No. 14/832,785, entitled "METHOD AND SYSTEM FOR PRE-IGNITION CONTROL," filed on Aug. 21, 2015. The entire contents of the above-referenced application are hereby incorporated by reference in its entirety for all purposes.

FIELD

The present description relates generally to methods and systems for pre-ignition detection and mitigation.

BACKGROUND/SUMMARY

Under certain operating conditions, engines that have high compression ratios, or are boosted to increase specific output, may be prone to low speed pre-ignition combustion events.

During pre-ignition, combustion of an air-fuel mixture in the cylinder is initiated before spark. The early combustion due to pre-ignition can cause very high in-cylinder pressures, and can result in combustion pressure waves similar to combustion knock, but with significantly larger intensity. Various strategies have been developed for the detection and mitigation of low speed pre-ignition (LSPI) in lower engine speed ranges, where the occurrence of pre-ignition tends to be higher. For example, pre-ignition may be detected and differentiated from knock using a knock sensor, and then mitigated using cylinder enrichment, load clipping, torque limiting, etc.

However, the inventors herein have recognized that pre-ignition can also occur at higher engine speeds, such as above 4000 rpm. Detection of pre-ignition in this range may be more difficult to due to presence of mechanical engine noise. If the high speed pre-ignition (HSPI) goes undetected, it can turn into "runaway pre-ignition" and potentially cause rapid engine degradation.

The inventors herein have identified approaches to at least partially address the above issue. In one example approach, high speed pre-ignition may be better detected and addressed by a method comprising: indicating pre-ignition based on each of an integrated knock sensor output in a knock window and an integrated knock sensor output in a pre-ignition window. In this way, engine degradation due to high speed pre-ignition can be identified and mitigated.

As one example, an engine system may include one or more knock sensors arranged in, at, or along an engine block or coupled to engine cylinders. Output from the knock sensor generated in one or more of a first and second crank angle timing window may be used to identify abnormal combustion, such as those due to knock and/or pre-ignition. As such, the first crank angle timing window may be a pre-ignition window and the second crank angle timing window may be a knock window, wherein the pre-ignition window occurs earlier (in the engine cycle) relative to the knock window.

Sensor output generated in the knock and pre-ignition windows may be processed (e.g., band pass filtered, rectified, and integrated) to determine respective output intensities. For example, output from the knock sensor may be integrated in each of the knock and pre-ignition windows to determine respective intensity of knock and pre-ignition. Further, output from the knock sensor generated in each knock window and pre-ignition window may be integrated over a plurality of engine cycles. Additionally, peak values within each of the knock and pre-ignition windows may be estimated for the plurality of engine cycles. High speed pre-ignition may be determined based upon the integrated output in each of the knock and pre-ignition windows over the plurality of engine cycles. For example, high speed pre-ignition may be indicated when an increase in the integrated sensor output in the knock window is followed by an increase in the integrated sensor output in the pre-ignition window. As another example, high speed pre-ignition may be confirmed based upon a decrease in peak values of knock sensor output in the knock window along with a concurrent increase in peak values of knock sensor output in the pre-ignition window over the plurality of engine cycles. Furthermore, upon determining the presence of high speed pre-ignition in a given cylinder, mitigating actions that are specific to high speed pre-ignition may be performed. For example, fuel injection into the affected cylinder may be temporarily suspended, and intake air flow adjustments may be used to reduce the engine load.

In this way, high speed pre-ignition may be detected and alleviated. The technical effect of monitoring a transition of abnormal combustion events from knock windows to pre-ignition windows over a plurality of engine cycles is that the presence of high speed pre-ignition may be detected more accurately, without the results being affected (e.g., corrupted) by mechanical engine noise. Further, an existing knock sensor may be used to identify high speed pre-ignition, and better distinguish it from low speed pre-ignition. As such, by identifying high speed pre-ignition reliably, and remedying the high speed pre-ignition promptly, durability of the engine may be extended and engine performance may be enhanced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
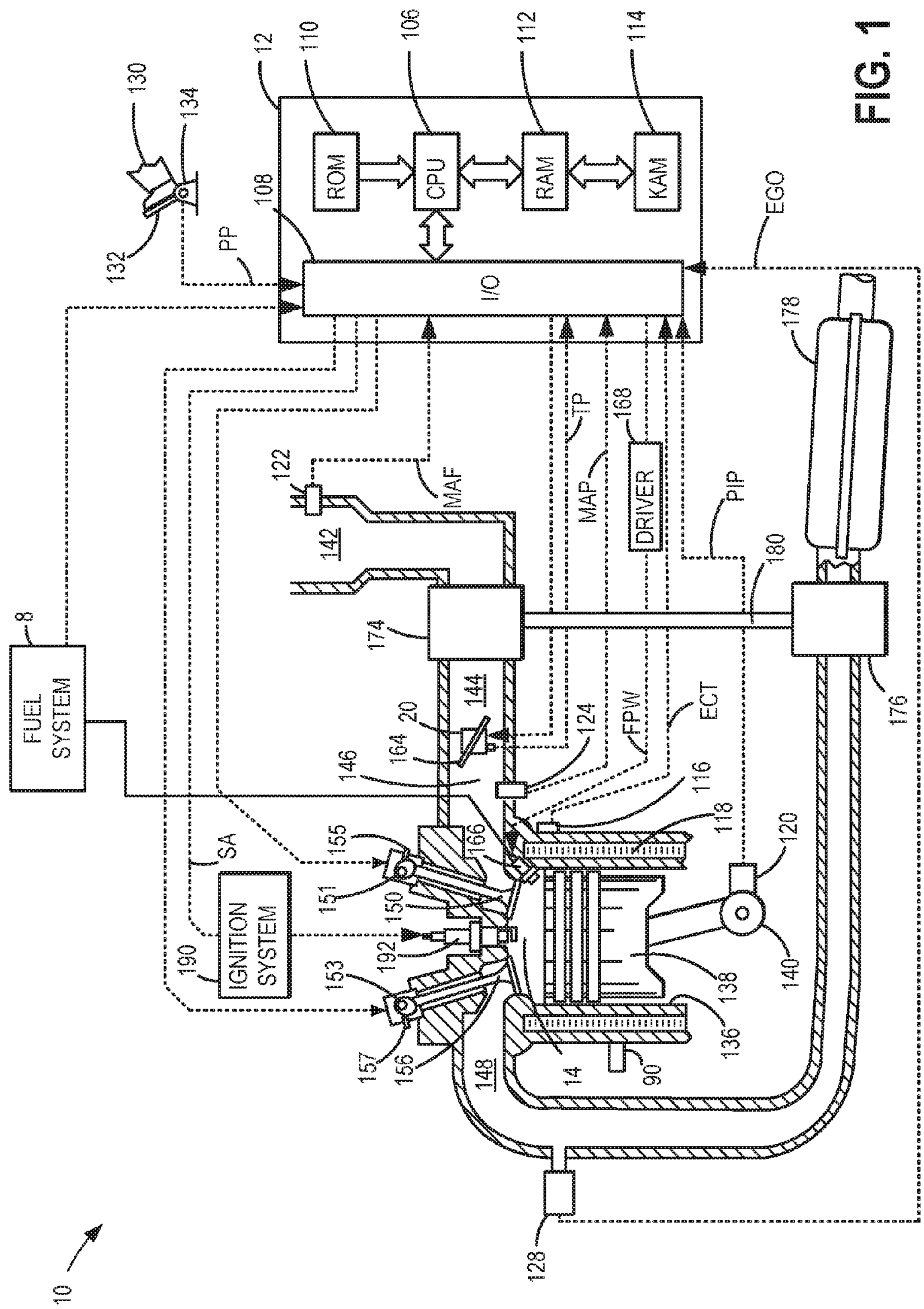
FIG. 1 shows a schematic engine.
Figure 4:
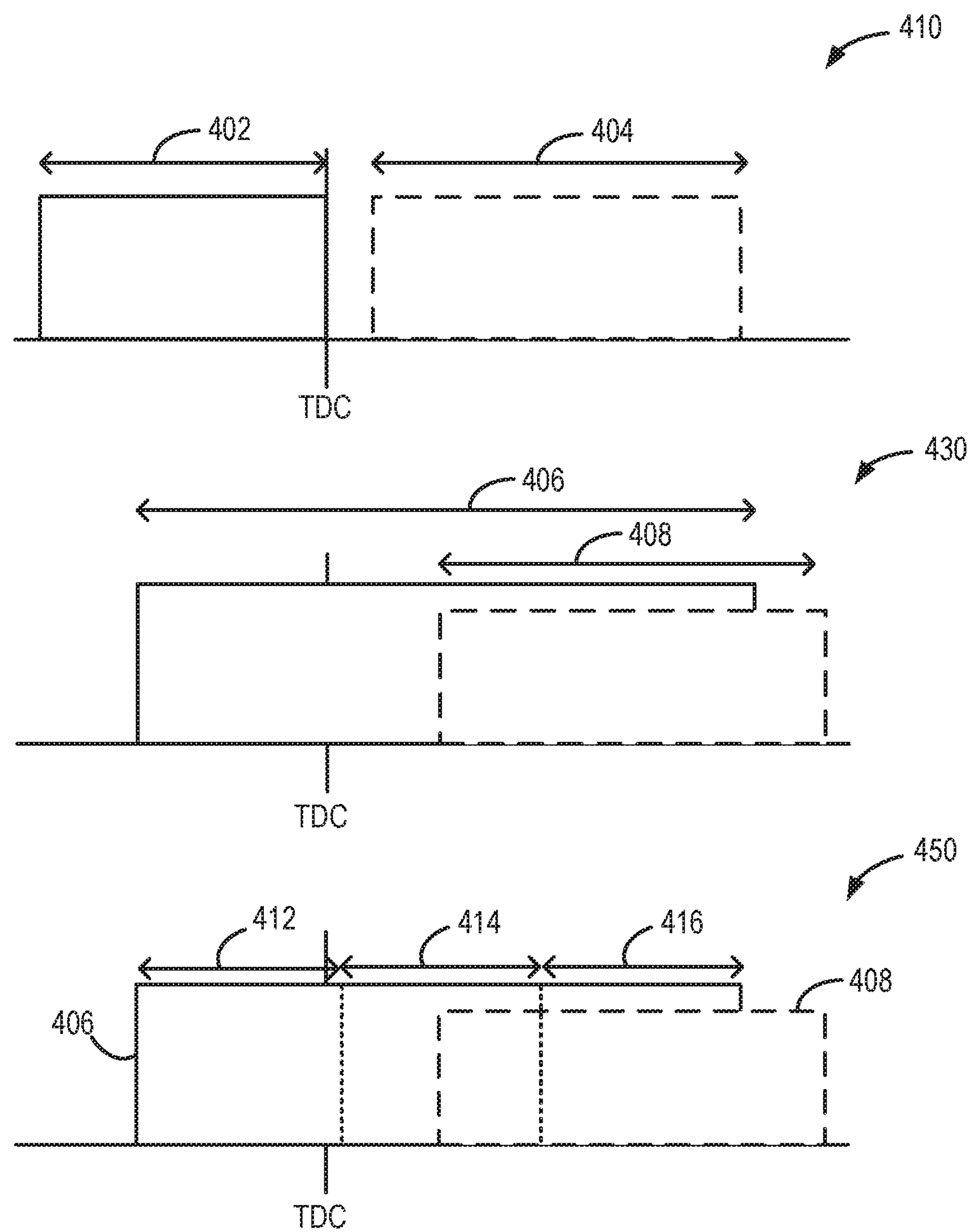
FIG. 4 portrays example knock and pre-ignition windows, with and without overlap that may be used for identifying HSPI.
Figure 5A:
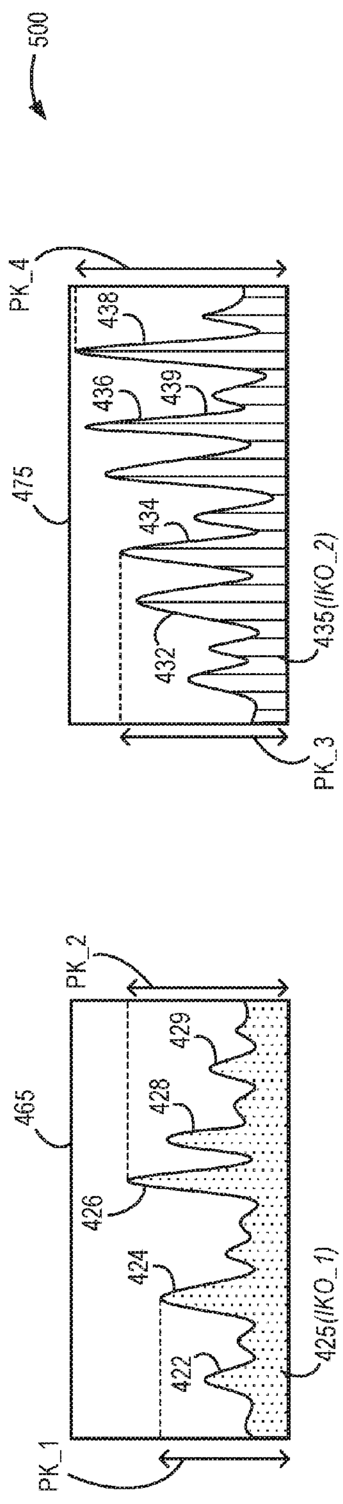
FIGS. 5A and 5B illustrate example knock sensor outputs in overlapping and non-overlapping knock and pre-ignition windows when HSPI is present.
Figure 5B:
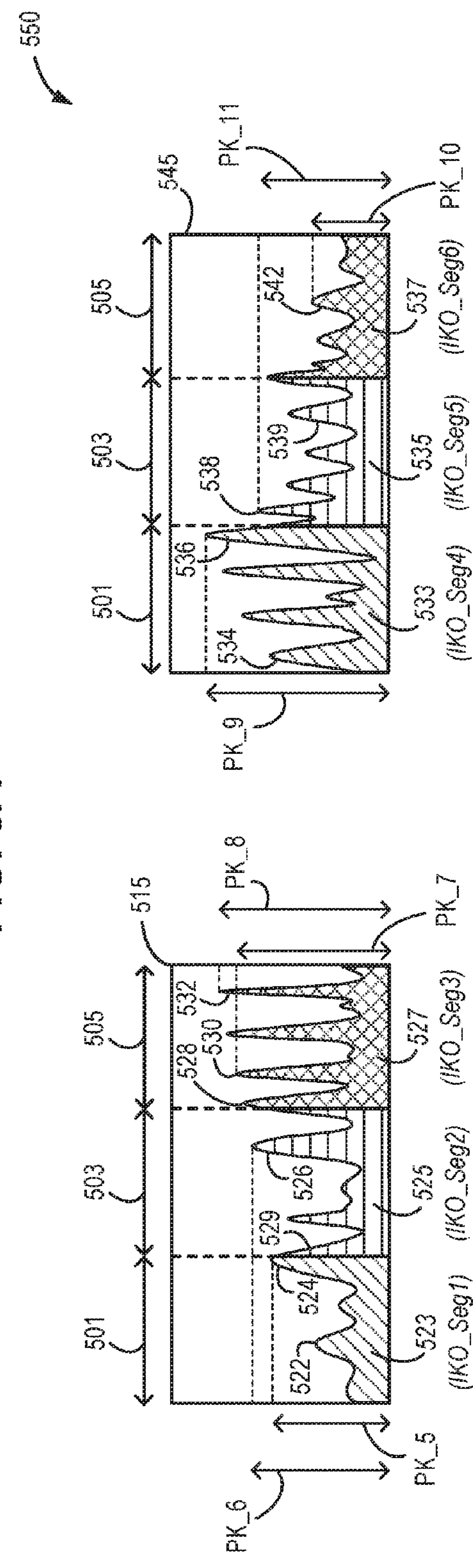
Figure 8:
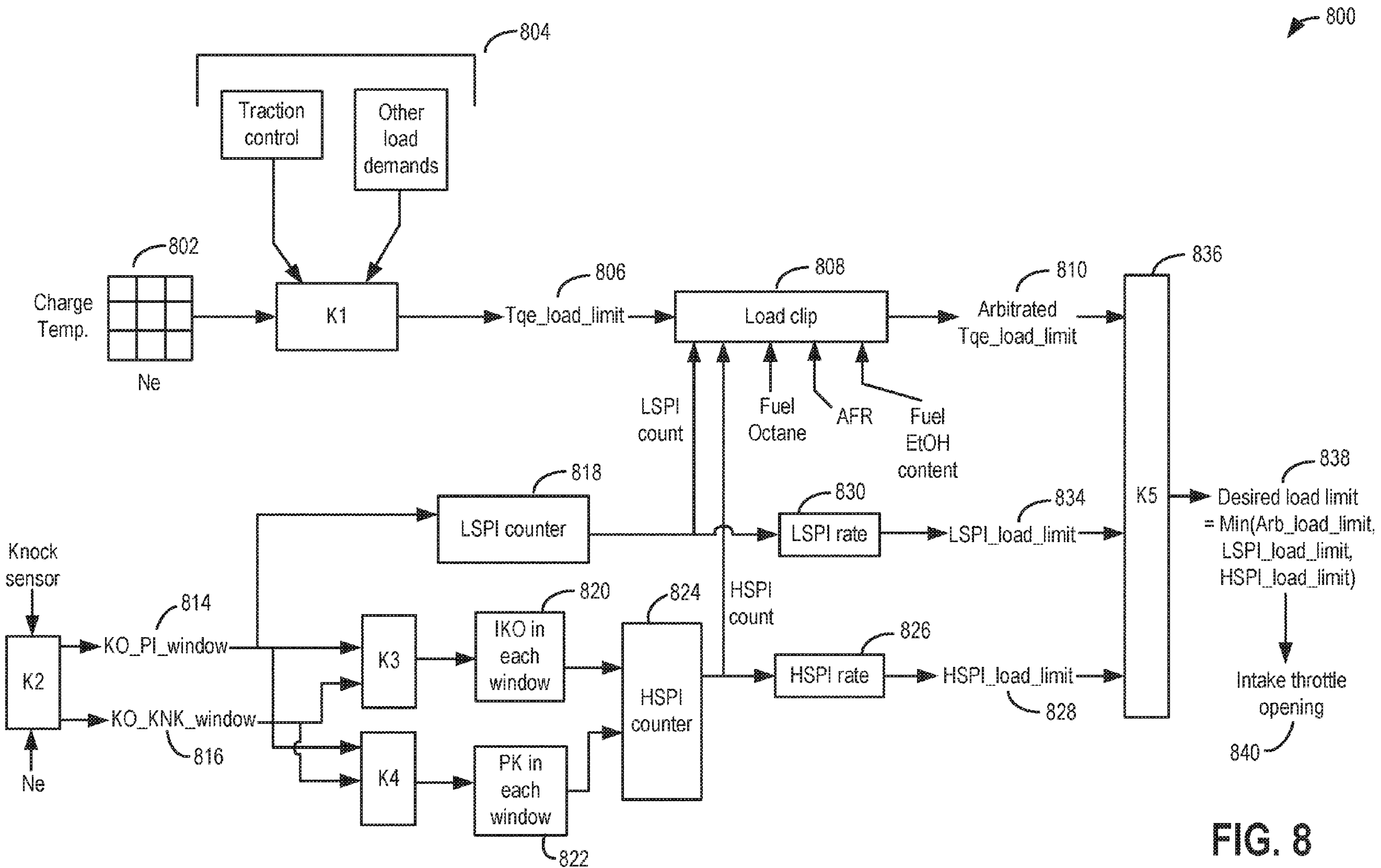
FIG. 8 presents a block diagram depicting adjusting of engine load-limiting based on the output of the knock sensor generated in knock windows and pre-ignition windows.
Figure 9:
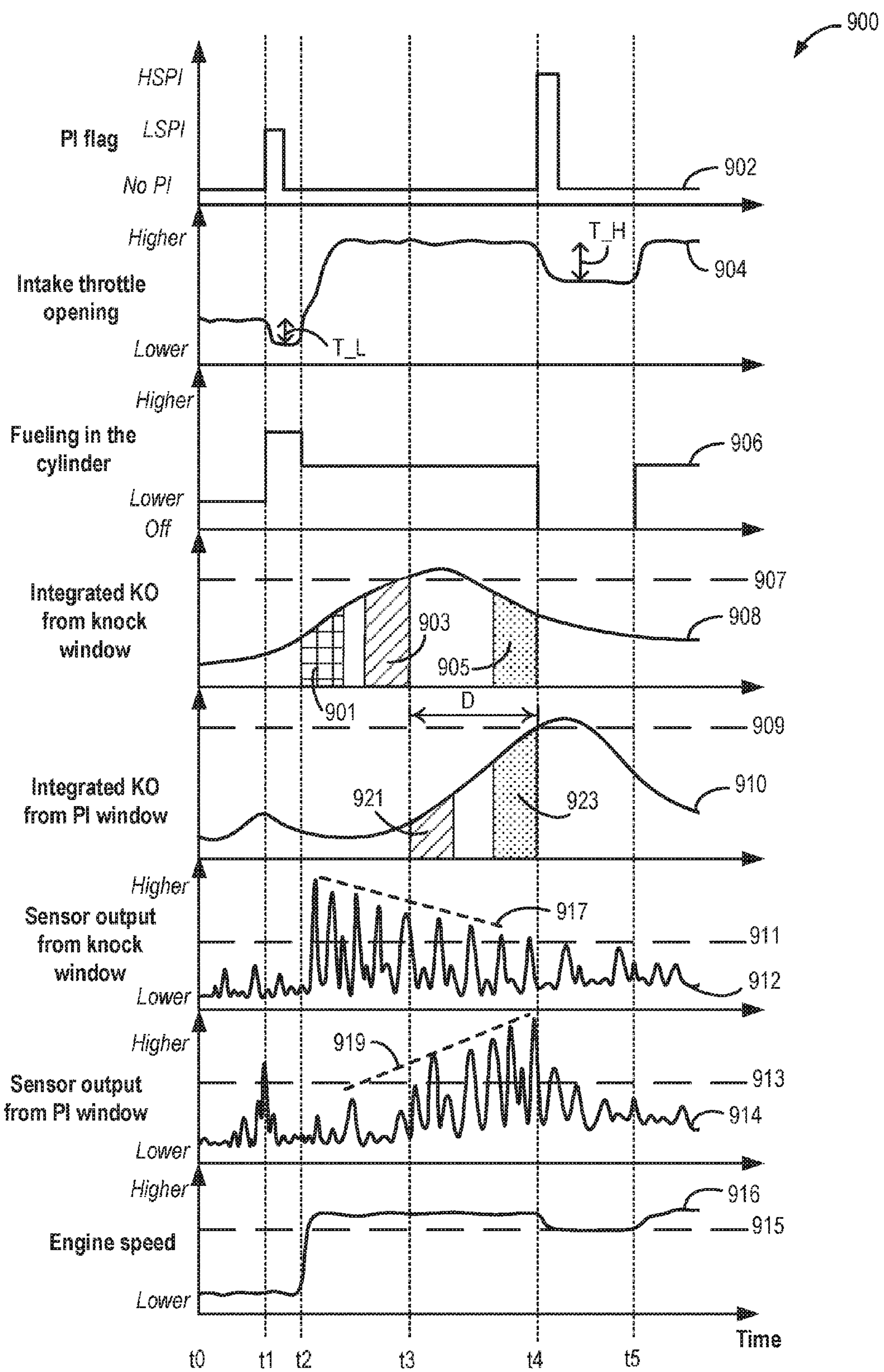
FIG. 9 illustrates an example detection and mitigation of HSPI when the knock and pre-ignition windows are non-overlapping.
Figure 10:
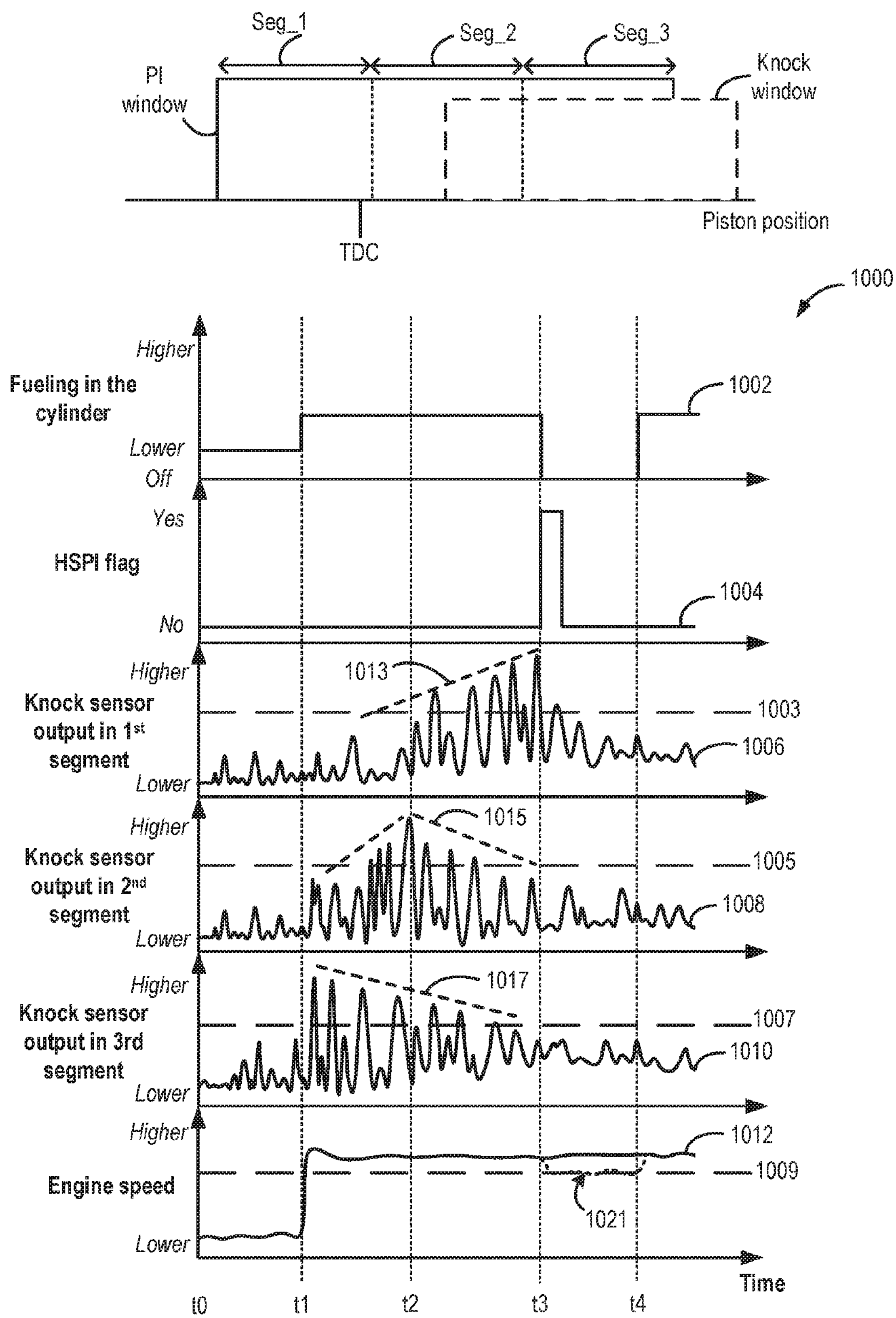
FIG. 10 portrays an example detection of HSPI when the knock and pre-ignition windows are overlapping at least partially.

The following description relates to systems and methods for identifying and mitigating high speed pre-ignition (HSPI) in an engine system, such as the example engine system of FIG. 1. An engine controller may be configured to perform a control routine, such as the routines of FIGS. 2, 3, 6, and 7, to detect HSPI based on the output of a knock sensor generated in each of an earlier pre-ignition window and a later knock window over multiple engine cycles (FIGS. 5A and 5B). The earlier pre-ignition window may either overlap or not overlap with the later knock window (FIG. 4). Examples of HSPI detection with non-overlapping and overlapping windows are depicted in FIGS. 9 and 10 respectively. Various mitigating actions may be performed in response to detecting HSPI in one or more cylinders of the engine system. For example, fueling of an affected cylinder may be discontinued. In another example, engine loads may be limited by reducing intake air flow. The controller may adjust engine load limits based on a plurality of factors including knock sensor output (FIG. 8). In this way, engine degradation due to HSPI may be reduced.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder 14 (herein also "combustion chamber 14') of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system (not shown). Further, a starter motor may be coupled to crankshaft 140 via a flywheel (not shown) to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake air passages 142 and 144, and an exhaust turbine 176 arranged along exhaust passage 148. Compressor 174 may be at least partially powered by exhaust turbine 176 via a shaft 180 where the boosting device is configured as a turbocharger. A wastegate (not shown) may be coupled across exhaust turbine 176 in the turbocharger. Specifically, the wastegate may be included in a bypass passage coupled between an inlet and outlet of the exhaust turbine 176. By adjusting a position of the wastegate, an amount of boost provided by the exhaust turbine may be controlled. The wastegate may be coupled to an electromechanical actuator which may receive commands from controller 12. However, in other examples, such as where engine 10 is provided with a supercharger, exhaust turbine 176 may be optionally omitted, where compressor 174 may be powered by mechanical input from a motor or the engine.

A throttle 20 (also termed, intake throttle 20) including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods.

An exhaust gas recirculation (EGR) system (not shown) may be used to route a desired portion of exhaust gas from exhaust passage 148 to intake air passage 142 upstream of compressor 174. An amount of EGR flow may be controlled by an EGR valve. Alternatively, a portion of combustion gases may be retained in the combustion chambers, as internal EGR, by controlling the timing of exhaust and intake valves. In yet another alternative, exhaust gases from upstream of the exhaust turbine may be directed to downstream of the compressor.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows fuel injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, fuel injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel tanks in fuel system 8 may hold fuel with different fuel qualities, such as different fuel compositions. These differences may include different alcohol content, different octane, different heat of vaporizations, different fuel blends, and/or combinations thereof etc.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda (λ) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Engine 10 may further include a knock sensor 90 coupled to each cylinder 14 for identifying abnormal cylinder combustion events, such as those related to knock, low speed pre-ignition (LSPI) and high speed pre-ignition (HSPI). In alternate embodiments, one or more knock sensors 90 may be coupled to selected locations of the engine block. The knock sensor may be an accelerometer on the cylinder block, or an ionization sensor configured in the spark plug of each cylinder.

Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from knock sensor 90. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. The controller 12 thus receives signals from the various sensors of FIG. 1 and employs the various actuators of FIG. 1 to adjust engine operation based on the received signals and instructions stored on a memory of the controller. For example, adjusting an amount of intake air flow may include adjusting an electromechanical actuator coupled to the intake throttle 20 to modify an opening of intake throttle 20.

Controller 12 may receive output of the knock sensor and in combination with the output of a crankshaft acceleration sensor may indicate abnormal combustion events in the cylinder(s). Specifically, knock sensor output may be received for pre-defined windows (e.g., crank angle timing windows) and may be used to detect knock, low speed pre-ignition, high speed pre-ignition events, etc. Herein, signals from the knock sensor, such as a signal timing, amplitude, intensity, frequency, etc., and signals from the crankshaft acceleration sensor for each of a pre-ignition window and a knock window may be monitored. For example, the pre-ignition window may be an earlier crank angle timing window (e.g., before a cylinder spark event) while the knock window may be a later crank angle timing window (e.g., after the cylinder spark event) in the same cylinder cycle. As such, the pre-ignition window may occur earlier in an engine cycle while the knock window occurs later in the same engine cycle for a common cylinder.

In one example, low speed pre-ignition (LSPI) may be indicated in response to knock sensor signals in the pre-ignition window that are larger (e.g., higher than a first threshold), while knock may be indicated in response to knock sensor signals in the knock window that are smaller (e.g., higher than a second threshold, the second threshold lower than the first threshold). In another example, LSPI may be indicated based upon knock sensor signals in the pre-ignition window that are less frequent while knock may be indicated based upon sensor signals in the knock window being more frequent. Thus, LSPI and knock indication may be based on comparison of knock sensor signals relative to pre-defined thresholds within respective windows over an engine cycle.

The controller may also identify high speed pre-ignition and may distinguish high speed pre-ignition (HSPI) from knock and/or LSPI. For example, HSPI may be identified based on the output of knock sensor 90 in knock and pre-ignition windows over a plurality of engine cycles when engine speed is higher than a threshold level. Herein, signals from the knock sensor for each of the pre-ignition window and the knock window may be received by the controller for a plurality of engine cycles. The controller may then integrate the signals from the knock sensor for each of the pre-ignition windows and the knock windows over the plurality of engine cycles. HSPI may be indicated in response to an integrated knock sensor signal from a knock window that initially increases (e.g., to higher than a third threshold, the third threshold higher than the first and second threshold), followed by a rise in integrated knock sensor signal in a pre-ignition window (e.g., to higher than a fourth threshold, the fourth threshold higher than the third threshold). Specifically, integrated sensor output in the knock windows during a first, earlier number of engine cycles may increase to higher than the third threshold. This increase may be followed by integrated sensor output in the pre-ignition windows rising to higher than the fourth threshold in a second, subsequent number of engine cycles.

As such, HSPI may be identified based on abnormal combustion events initially occurring at later timings in the cylinder cycles (e.g., after cylinder spark) and a subsequent transition of the abnormal combustion events to earlier timings in ensuing cylinder cycles (e.g., earlier than cylinder spark). Thus, sensor output in the knock windows may be more frequent and more intense (e.g., higher than the third threshold) relative to sensor output in the pre-ignition windows during a first, earlier number of engine cycles. However, in a second, later number of engine cycles, sensor output in the knock windows may become less regular and less intense while sensor output in the pre-ignition windows concurrently becomes more intense and more frequent. The controller may thereby also learn a gradual advancing of combustion initiation, and correlate that transition with the propensity for a high speed pre-ignition event. HSPI may also be detected based on peak values of knock sensor output gradually moving from the knock windows to the pre-ignition windows. As such, HSPI may be indicated when peak values of knock sensor signals in knock windows begin to decrease with a concomitant rise in peak values of knock sensor signals in pre-ignition windows.

Thus, the controller may monitor and compare output from the knock sensor in a plurality of knock windows and pre-ignition windows over multiple engine cycles to establish presence of HSPI. However, LSPI and knock may be detected by comparing knock sensor output to pre-determined thresholds within a specific pre-ignition window and a specific knock window. Further, LSPI and knock may be identified without integrating knock sensor output over multiple engine cycles while HSPI may be detected by integrating sensor output and comparing integrated sensor output over a plurality of engine cycles. It will also be appreciated that the inventors herein have recognized that each type of pre-ignition (LSPI and HSPI) may be mitigated in a distinct manner, which will be detailed in reference to FIG. 3 below.

Turning now to FIG. 4, example knock and pre-ignition windows are depicted for a cylinder in a single engine cycle in first map 410, second map 430, and third map 450. Specifically, first map 410 depicts non-overlapping pre-ignition and knock windows while second map 430 and third map 450 depict overlapping knock and pre-ignition windows. The windows are depicted in reference to a position of a piston within the cylinder shown along the horizontal axis. In particular, the example knock and pre-ignition windows are portrayed in reference to a top dead center (TDC) position of the piston when a spark event may occur. The controller may detect pre-ignition and knock events based on output from the knock sensor in either overlapping or non-overlapping windows (e.g., knock and pre-ignition windows).

It will be appreciated that the pre-ignition and knock windows discussed herein may be adjusted so as to capture a variety of abnormal combustion events. Further, a size of the pre-ignition windows and the knock windows may be varied based on engine parameters. In one example, the size of each of the windows may be adjusted based on engine speed. Further, a size of the windows may be adjusted relative to one another.

First map 410 depicts a first example pre-ignition window 402 and a first example knock window 404 with no overlap. Pre-ignition window 402 occurs at an earlier crank timing relative to knock window 404 within the same engine cycle in the cylinder. Specifically, pre-ignition window 402 begins before a spark event (e.g., before TDC) in the cylinder and ends at TDC. Knock window 404, however, begins much after the pre-ignition window has ended (e.g., after TDC) and closes during a subsequent expansion stroke. As such, pre-ignition window 402 does not overlap with knock window 404. To elaborate, pre-ignition window 402 begins and ends before knock window 404 in the same engine cycle. In the case of non-overlapping windows, knock sensor signals in the pre-ignition window may be assessed distinct from the knock sensor signals in corresponding knock windows. Herein, HSPI may be determined by tracking and comparing knock sensor signals in each of the pre-ignition and knock windows over numerous consecutive engine cycles. Likewise, LSPI may be determined by comparing knock sensor signals (not integrated) in the pre-ignition window over an engine cycle relative to a pre-ignition threshold, while knock may be determined by comparing knock sensor signals (not integrated) in the knock window over an engine cycle relative to a knock threshold.

Referring now to FIG. 5A, it includes map 500 illustrating example schematic knock sensor outputs in two windows for two distinct engine cycles in a cylinder. The windows may either be knock windows or pre-ignition windows. Specifically, each of window 465 and window 475 in map 500 of FIG. 5A may be knock windows or each of window 465 and window 475 may be pre-ignition windows. Further, the windows may include knock sensor output for the same cylinder over two consecutive engine cycles: engine cycle 'n' and engine cycle 'n+1'. Alternatively, the two engine cycles may not be consecutive and instead may be separated from each other by at least one engine cycle. Specifically, engine cycle 'n+1' may be subsequent to engine cycle 'n' and window 475 may follow window 465.

Window 465 of engine cycle 'n' includes knock sensor output in the form of curve 429. Further, curve 429 may include a plurality of peaks and valleys as depicted. As an example, knock sensor output in window 465 includes peaks 422, 424, 426, 428, as well as other peaks that are not numbered. Window 475, which occurs in an engine cycle later than engine cycle 'n', shows an example knock sensor output in the form of curve 439. Similar to curve 429, curve 439 may include a plurality of peaks and valleys as depicted. As an example, knock sensor output in window 475 includes peaks 432, 434, 436, 438, as well as other peaks that are not numbered.

The knock sensor output in a given window may be processed (e.g., amplified, band pass filtered, rectified, integrated) to determine an output intensity for the given window. For example, output intensity for window 465 (IKO_1) may be determined by integrating the sensor output within window 465 via an integrator (e.g., via summation over time as an approximation to a time-based integral). Herein, output intensity in window 465 can be represented as area 425 (dotted area) under curve 429. Similarly, output intensity for window 475 (IKO_2) may be determined by integrating the sensor output in window 475, and can be represented as area 435 (area with vertical lines) under curve 439.

In one example, if window 465 (and window 475) is a knock window, the output intensity in window 465 may be compared to a first threshold to determine the presence of knock. If window 465 is a pre-ignition window, output intensity in window 465 may be compared to a second threshold to detect the presence of LSPI. Herein, the second threshold may be higher than the first threshold. In another example, a frequency of knock sensor output in the knock window may be compared to the first threshold to indicate knock. Alternatively, a frequency of knock sensor output in the pre-ignition window can be compared to the second threshold to detect presence of LSPI. In this case, the knock sensor output may not be integrated. It will be noted that the frequency of knock sensor output as used in this disclosure implies an incidence or a number of recurring events or peaks.

The output intensities of each knock window and pre-ignition window may also be monitored over multiple engine cycles to establish the presence of HSPI. It will be understood that output intensity of a window (e.g., knock, pre-ignition) herein indicates an integrated knock sensor output within the window (e.g., IKO_1 of window 465, IKO_2 of window 475). HSPI may be established by integrating output intensities of each knock window and each pre-ignition window over multiple engine cycles. To elaborate, knock sensor output in knock windows may be integrated over multiple engine cycles and knock sensor output in pre-ignition windows may also be integrated over a plurality of engine cycles. In the example of windows 465 and 475, HSPI may be determined by combining IKO_1 and IKO_2 to determine integrated output intensity.

As will be described in further detail in reference to FIG. 6, HSPI may be indicated when integrated sensor output in knock windows over multiple engine cycles increases to higher than a threshold output followed by an increase in integrated sensor output in pre-ignition windows over multiple engine cycles. As such, output intensity in knock windows may be initially higher (e.g., in earlier engine cycles) and may decrease in later engine cycles while output intensities in pre-ignition windows may initially be lower (e.g., in earlier engine cycles) followed by an increase in later engine cycles.

In addition to determining output intensity in a window by integrating the knock sensor output within the window, the controller may also determine peak values within the window. The peak value may represent the peak intensity, or a peak amplitude. Peak values, as understood herein, include a height of a peak (relative to a baseline of the knock sensor output) in the knock sensor output. For example, in window 465 peak 424 has a peak value of PK_1 while peak 426 has a peak value of PK_2. Further, peak 426 has a higher (e.g., highest) peak value than other peaks in window 465. Similarly, the controller may determine peak values within window 475. For example, peak 434 in window 475 has a peak value of PK_3 while peak 438 has a peak value of PK_4. As shown, peak 438 has a higher peak value than peak 434 in window 475. Further still, peak 438 has a higher (e.g., highest) peak value relative to other peaks in window 475. In one example, the peak value of the window may be the height of the tallest peak in the knock sensor output. For example, peak value of window 465 may be PK_2 while peak value of window 475 may be PK_4. In another example, the peak value of the window may be an average of all heights of all peaks in the knock sensor output. Peak values for windows 465 and 475 may be estimated in alternate ways without departing from the scope of this disclosure. HSPI may also be indicated based on peak values of knock sensor output in knock and pre-ignition windows over the plurality of engine cycles. In particular, HSPI may be present when peak values in knock windows decrease over the plurality of engine cycles with a simultaneous increase in peak values in pre-ignition windows.

Returning to FIG. 4, second map 430 of FIG. 4 portrays a second example pre-ignition window 406 overlapping with a second example knock window 408. Herein, pre-ignition window 406 starts from before a spark event (before TDC) in the cylinder and ends during an ensuing expansion stroke, while knock window 408 starts from after the spark event (after TDC) in the cylinder and ends during the expansion stroke, after the pre-ignition window has ended. In other words, the pre-ignition window ends only after the knock window has commenced. Thus, knock window 408 at least partially overlaps pre-ignition window 406.

In one example, when assessing for knock and LSPI in the overlapping windows, a controller may first compare the output of the knock sensor in the pre-ignition window relative to a pre-ignition threshold. If the output is higher than the pre-ignition threshold and engine speed is lower than a threshold (e.g., a speed threshold), LSPI may be determined and each of engine fueling, air flow and spark timing may be adjusted. If the output in the pre-ignition window is not higher than the pre-ignition threshold, the output of the knock sensor in the knock window may be compared to a knock threshold. If the output is higher than the knock threshold, knock may be determined and spark timing may be adjusted.

To evaluate the presence of HSPI when receiving knock sensor output from overlapping windows, the controller may additionally or optionally divide at least the pre-ignition window into a plurality of segments as shown in third map 450. Further, knock sensor output in each of the plurality of segments may be compared. Third map 450 includes pre-ignition window 406 and knock window 408 of second map 430. Herein, pre-ignition window 406 is split into three segments: first segment 412, second segment 414, and third segment 416. It will be noted that the pre-ignition window may be split into a number of segments that is greater than three or fewer than three without departing from the scope of this disclosure. As such, the three segments of pre-ignition window 406 are simply an example. The number of segments that the pre-ignition window is split into may depend on an amount of overlap between the knock and pre-ignition windows. For example, the pre-ignition window may be split into a higher number of segments if the degree of overlap between the knock and pre-ignition windows is greater. Alternatively, if the degree of overlap between the knock and pre-ignition windows is lower, the pre-ignition window may be divided into fewer segments. In another example, the number of segments that the pre-ignition window is divided into may also depend on engine operating conditions including engine speed, load, spark timing, etc. In yet another example, the number of segments that the pre-ignition is split into may depend on the application (e.g., engine type).

In some examples, the knock window may be divided into a plurality of segments instead of splitting the pre-ignition window. In yet another example, based on the degree of overlap between the windows, both the knock and pre-ignition windows may be segmented.

Referring now to FIG. 5B, example schematic knock sensor outputs in two segmented pre-ignition windows are depicted in map 550. For example, each of pre-ignition windows 515 and 545 may overlap with corresponding knock windows (not shown) during engine cycle ‘p’ and engine cycle ‘p+1’, respectively. To elaborate, pre-ignition window 515 may at least partially overlap a knock window in engine cycle ‘p’ while pre-ignition window 545 may at least partially overlap a knock window in engine cycle ‘p+1’. Accordingly, the pre-ignition windows may be segmented to determine the presence of HSPI.

The segmented pre-ignition windows 515 and 545 may include knock sensor output for the same cylinder over two consecutive engine cycles: engine cycle ‘p’ and engine cycle ‘p+1’. Alternatively, the two engine cycles depicted in map 550 may not be consecutive and instead may be separated from each other by at least one engine cycle. Regardless, engine cycle ‘p+1’ may be subsequent to engine cycle ‘p’ and window 545 may follow window 515.

Pre-ignition window 515 of engine cycle ‘p’ may be split into three segments: first segment 501, second segment 503, and third segment 505. Further, pre-ignition window 515 includes knock sensor output in the form of curve 529 and each of the three segments include a portion of curve 529. Likewise, pre-ignition window 545 of engine cycle ‘p+1’ may also be split into the same three segments: first segment 501, second segment 503, and third segment 505. Further still, knock sensor output in pre-ignition window 545 may be represented schematically as curve 539. Each of the three segments of pre-ignition window 545 include a portion of curve 539. It will be noted that first segment 501 may occur earlier within an engine cycle relative to third segment 505 in the engine cycle. In other words, third segment 505 occurs at a later time than the first segment 501 in the same engine cycle. As such, first segment 501 may be termed an earlier segment while third segment 505 may be termed a later segment.

In order to determine HSPI using overlapping knock and pre-ignition windows, knock sensor output in the segments of the pre-ignition windows may be compared. In one example method, output intensity of each segment may be estimated by integrating knock sensor output within each segment. The output intensity for first segment 501 of pre-ignition window 515 (IKO_Seg1) is represented by area 523 (slanted lines). Similarly, integrated knock sensor output for second segment 503 of pre-ignition window 515 (IKO_Seg2) is represented by area 525 (horizontal lines) and integrated knock sensor output for third segment 505 of pre-ignition window 515 (IKO_Seg3) is represented by area 527 (crosshatched lines). In pre-ignition window 545, output intensity for first segment 501 (IKO_Seg4) is represented by area 533 (slanted lines). Likewise, output intensity for second segment 503 of pre-ignition window 545 (IKO_Seg5) is represented by area 535 (horizontal lines) and integrated knock sensor output for third segment 505 of pre-ignition window 545 (IKO_Seg6) is represented by area 537 (crosshatched lines).

As depicted in map 550, within engine cycle ‘p’, which is earlier than engine cycle ‘p+1’, output intensity in third segment 507 (IKO_Seg3) of pre-ignition window 515 may be higher than output intensity in each of second segment 503 (IKO_Seg2) and first segment 501 (IKO_Seg1). Further, integrated sensor output in the first segment 501 of pre-ignition window 515 may be lower than second segment 503. To elaborate, area 527 in later segment (e.g., third segment 505) of pre-ignition window 515 may be higher than that in the earlier segments of pre-ignition window 515. In other words, output intensity in the later segment may be higher than that in the earlier segment during an early engine cycle.

Further still, in the subsequent engine cycle ‘p+1’, integrated sensor output in third segment 505 (IKO_Seg6) of pre-ignition window 545 represented by area 537 may decrease relative to integrated sensor output in third segment 505 (IKO_Seg3) in pre-ignition window 515. At the same time, integrated sensor output in first segment 501 of pre-ignition window 545 (IKO_Seg4) may be higher than each of integrated sensor output in the first segment 501 of pre-ignition window 515 (IKO_Seg1) and integrated sensor output in third segment 505 (IKO_Seg6) of pre-ignition window 545 represented by area 537.

As mentioned earlier, HSPI may be identified in general when combustion commences at (or transitions towards) earlier times in an engine cycle relative to preceding engine cycles. In the example of segmented pre-ignition windows 515 and 545, HSPI may be indicated in response to output intensity in later segments (e.g., third segment 505) being higher than output intensities in earlier segments during initial engine cycles (e.g., engine cycle ‘p’) followed by a decrease in output intensity in later segments and an increase in output intensity in earlier segments during ensuing engine cycles (e.g., engine cycle ‘p+1’).

While pre-ignition windows 515 and 545 show a transition in combustion events from the later, third segments to the earlier, first segments over two engine cycles for ease of explanation, the progression of combustion events from later segments to earlier segments in actuality may occur over a larger number of engine cycles. For example, output intensity may initially be higher in the later, third segments. This may be followed by a gradual rise in output intensity in middle, second segments over a plurality of engine cycles, while concurrently the output intensity in the later, third segments starts to fall. During this entire time, the output intensity in the earlier, first segments may be lower than each of the middle and later segments. As the number of engine cycles increases, output intensity in the earlier, first segments may increase steadily as output intensities in the each of middle, second segments and later, third segments diminish steadily. In this way, the knock sensor output intensity may gradually transition (herein, advance) from later segments of a window to earlier segments of a window over time (counted here in terms of engine cycles). This gradual advancement of combustion initiation may be correlated with the presence of HSPI.

In another example, peak values of the segments in the pre-ignition windows may be compared to identify HSPI. As described earlier, peak value may be represented by a height of a peak in an example knock sensor signal. Curve 529 in pre-ignition window 515 may include a plurality of peaks and valleys as depicted. As an example, knock sensor output in pre-ignition window 515 in engine cycle 'p' includes peaks 522 and 524 in first segment 501, peak 526 in second segment 503, and peaks 528, 530, and 532 in third segment 505 (amongst other peaks that are not numbered). Third segment 505 of pre-ignition window 515 includes peak 532, which has a peak value of PK_8 while peak 530 has a peak value of PK_7. Meanwhile, second segment 503 of pre-ignition window 515 in the same engine cycle 'p' has peak 526 with peak value PK_6 while peak 524 in first segment 501 of pre-ignition window 515 has peak value PK_5. As depicted, peak values in the earlier, first segment are lower than those in each of the middle, second segment and later, third segments. Further, peak 532 in the third, later segment has a higher (e.g., highest) peak value than other peaks in window 515. Thus, peak values in the later, third segment 505 may be higher than those in each of middle, second segment 503, and earlier, first segment 501 during an earlier engine cycle such as engine cycle 'p'.

Pre-ignition window 545, which occurs in an engine cycle later than engine cycle 'p', shows an example knock sensor output in the form of curve 539. Similar to curve 529, curve 539 may include a plurality of peaks and valleys as depicted. As an example, knock sensor output in pre-ignition window 545 in engine cycle 'p+1' includes peaks 534 and 536 in first segment 501, peak 538 in second segment 503, and peak 542 in third segment 505, as well as other peaks that are not numbered. As shown in pre-ignition window 545, peak value of peak 542 in third segment 505 is PK_10, which is significantly lower than peak value PK_8 of peak 532 in third segment 505 of pre-ignition window 515. In other words, peak values in the later segments have decreased over multiple engine cycles. At the same time, peak value in first segment 501 of pre-ignition window 545 (e.g., of peak 536) is PK_9 which is considerably higher than each of peak value PK_10 and peak value PK_5 in first segment 501 of pre-ignition window 515. Thus, peak values in the earlier, first segments undergo an increase over multiple engine cycles. As engine cycle 'p+1' is subsequent to engine cycle 'p', HSPI may be indicated based on the decrease in peak values in the later, third segment and a simultaneous increase in peak values in the earlier, first segments over multiple engine cycles. In this way, peak values of the knock sensor output may gradually transition (herein, advance) from later segments of a window to earlier segments of a window over time (counted here in terms of engine cycles). This gradual advancement of combustion initiation may be correlated with the presence of HSPI.

In this manner, HSPI may be identified with overlapping pre-ignition and knock windows. While the above examples illustrate splitting only the pre-ignition window into segments, in other examples, the knock window may, additionally or alternatively, be split into segments. In another example, only one of the knock and pre-ignition windows may be segmented when window overlap occurs. The number of segments that the knock window is divided into may be based upon a degree of overlap existing between the knock and pre-ignition windows, the number of segments increased as the degree of overlap increases. Similar to comparing segments in the pre-ignition windows over a plurality of engine cycles, knock sensor output within the segments of the knock window maybe compared over multiple engine cycles. HSPI may be confirmed when output intensities in later segments are initially higher than output intensities in earlier segments followed by a decrease in output intensities in later segments as a number of engine cycles increases. At the same time, output intensity in earlier windows may also rise as the number of engine cycles increases. In other words, HSPI may be confirmed by observing a movement of combustion initiation from later segments to earlier segments over multiple engine cycles.

Figure 2:
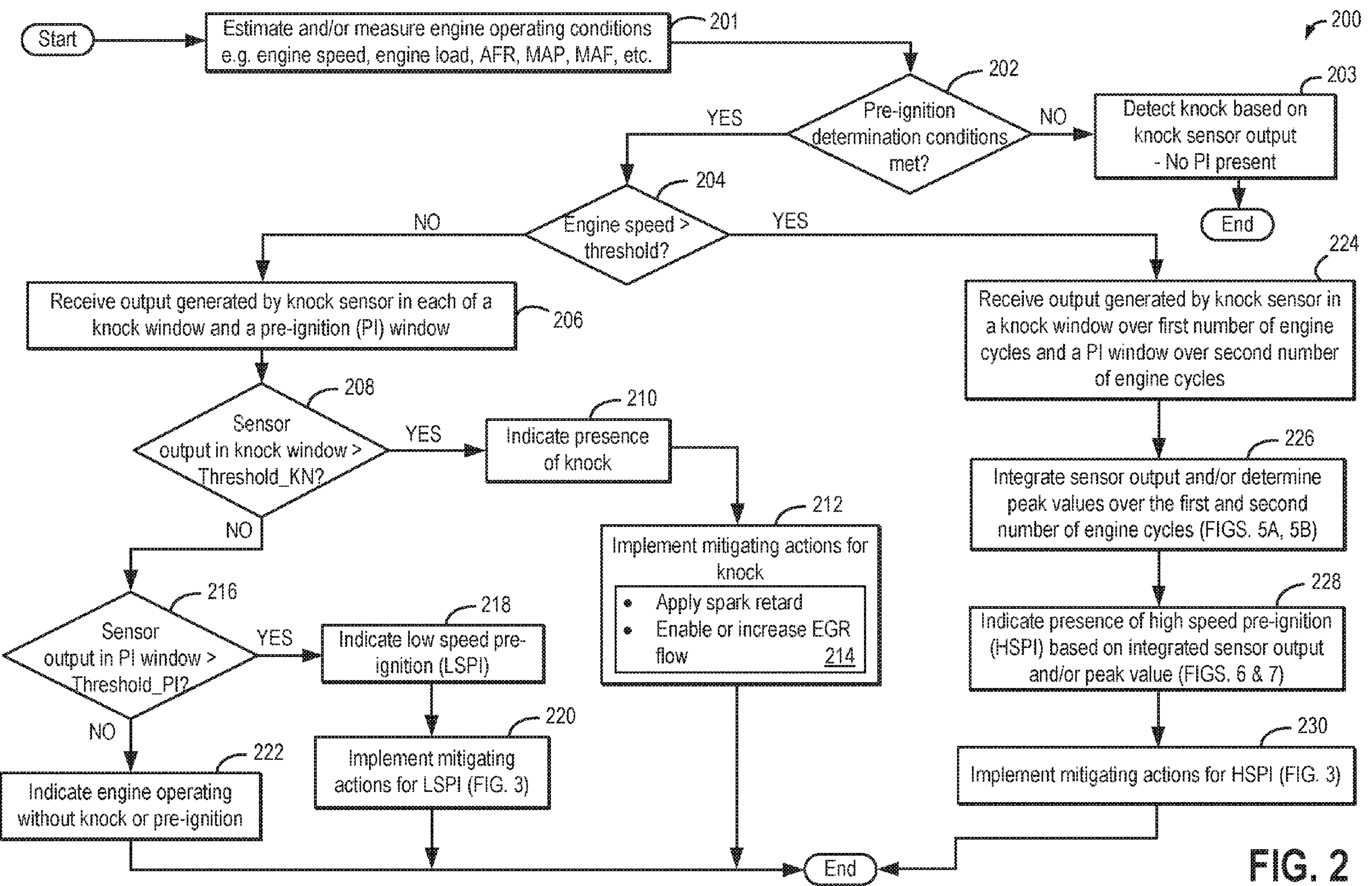
FIG. 2 depicts a high level flow chart for distinguishing low speed pre-ignition (LSPI) and high speed pre-ignition (HSPI).

Turning now to FIG. 2, it depicts an example routine 200 illustrating detection of various abnormal combustion events such as knock, LSPI, and HSPI. Specifically, engine speed and output from a knock sensor, such as knock sensor 90 of FIG. 1, in a knock window and a pre-ignition window may be utilized to differentiate between knock, LSPI, and HSPI. As such, routine 200 will be described in relation to the engine system shown in FIG. 1, but it should be understood that similar routines may be used with other systems without departing from the scope of this disclosure. Instructions for carrying out routine 200 included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1 to adjust engine operation and mitigate the abnormal combustion events, according to the routines described below.

At 201, routine 200 estimates and/or measures existing engine operating conditions. Engine operating conditions may include engine speed, engine load, torque demand, air-fuel ratio, manifold absolute pressure (MAP), mass air flow, engine temperature, etc. For example, engine speed may be estimated based on output from the crankshaft acceleration sensor, such as Hall effect sensor 120 of FIG. 1. Next, at 202, routine 200 determines if pre-ignition determination conditions are met. In one example, pre-ignition determination conditions may be confirmed in response to engine load being higher than a load threshold. As such, pre-ignition events may not occur when the engine is operating at a load lower than the load threshold. Further, abnormal combustion events at lower engine loads may be due to knock. Thus, if pre-ignition determination conditions are not met at 202, routine 200 continues to 203 to assess the presence of knock. Knock sensor output in a knock window may be examined and may be compared to a first threshold to detect the presence of knock. Further, the controller may also determine that abnormal combustion events, if present, are not due to pre-ignition. Routine 200 may then end.

Thus, abnormal events at lower engine loads (such as lower than the load threshold) may be correlated to knock and not to pre-ignition.

If, however, pre-ignition determination conditions are met at 202 (e.g., engine load is higher than the load threshold), routine 200 continues to 204. When engine load is higher than the load threshold, abnormal combustion events may be due to one of knock, LSPI, and HSPI. At 204, routine 200 determines if engine speed is higher than a threshold (e.g., a threshold speed). In one example, the threshold may be 4000 RPM. In another example, the threshold may be 4500 RPM. If the engine speed is lower than the threshold, abnormal combustion events in the engine may be attributed to LSPI and/or knock. In addition to determining that the existing engine speed is either higher or lower than the threshold, routine 200 also relies on output from the knock sensor to identify LSPI, knock, and HSPI.

If it is determined at 204 that engine speed is lower than the threshold, routine 200 continues to 206 to receive output from the knock sensor for each of a pre-ignition window and a knock window. Further, output from the knock sensor may be received for each cylinder of an engine in a common engine cycle. As mentioned earlier, the pre-ignition window may occur at an earlier time during the common engine cycle for a given cylinder relative to the knock window. In addition, the output of any signals generated by the knock sensor outside the defined windows (e.g., pre-ignition window, knock window) may be disregarded.

Next, at 208, output from the knock sensor for a given knock window is compared to first threshold, Threshold_KN. Specifically, routine 200 confirms if knock sensor output for the given knock window is higher than the first threshold. The first threshold may be based on a likelihood of cylinder knock, for example. Output from the knock sensor generated in the knock window may be processed in different ways, e.g., amplified, band-pass filtered, rectified, and integrated. In one example, output intensity for the knock window may be determined, as described earlier in reference to FIG. 5A, by aggregating knock sensor output in the knock window. This output intensity in the knock window (or knock intensity) may be compared to the first threshold. In another example, a frequency of the knock sensor output may be determined and compared to the first threshold. In yet another example, an amplitude of the sensor output may be utilized to detect the presence of knock.

If it is determined that the output of the knock sensor is higher than the first threshold, routine 200 continues to 210 to indicate the presence of knock. Additionally, a knock counter may be incremented to track a number of knock events (e.g., a knock count) that have occurred over the current drive cycle. The knock count may be stored in a cylinder-specific manner and may include the knock count for each cylinder over the drive cycle, as well as the knock count of the engine over the drive cycle.

Further, at 212, mitigating actions for knock are implemented. As such, knock may be controlled by adjusting spark timing and/or enabling exhaust gas recirculation (EGR) flow. Accordingly, in response to the indication of knock, spark timing is retarded at 214. For example, the controller may refer a look-up table stored as a function of knock sensor output relative to engine speed to determine the amount of spark retard to be applied. Additionally or alternatively, EGR flow is enabled at 214. Herein, an electromechanical actuator coupled to the EGR valve may receive a signal from the controller to open the EGR valve (e.g., from closed) and initiate EGR flow. If recirculation of exhaust gases into the engine is already occurring, a flow rate of the EGR may be increased at 214. For example, an opening of the EGR valve may be increased to increase the flow rate of EGR. The increase in EGR flow may however be regulated based on preserving combustion stability. For example, the EGR flow may not be increased if a tip-out condition to lower loads is occurring. In one example, the EGR flow includes cooled low pressure EGR flow. In another example, the EGR flow includes cooled high-pressure EGR flow, or a combination of LP-EGR and HP-EGR flow. Routine 200 then ends.

The amount of spark retard or increase in EGR applied in response to the indication of knock may be adjusted based on the knock count. For example, as the knock count (of the cylinder, or the engine) increases (e.g., increases beyond a threshold count), a larger degree of spark retard may be applied and/or EGR may be increased by a larger amount to reduce the likelihood of further knock events in the affected cylinder. The amount of spark retard applied may be further adjusted based on an amount of EGR that is enabled. For example, less spark retard may be applied if an amount of LP-EGR is enabled. It will be appreciated that retarding spark timing may be an initial (e.g., first) action in response to knock. As such, spark retard may provide a more immediate mitigating effect on knock. Enabling or increasing EGR flow may follow the spark retard because EGR flow may have a slower mitigating effect on knock.

Returning to 208, if it is determined that output from the knock sensor in the given knock window is not higher than the first threshold, routine 200 continues to 216 to determine if output from the knock sensor in a given pre-ignition window is higher than a second threshold, Threshold_PI. As such, second threshold, Threshold_PI may be higher than the first threshold, Threshold_KN. Output from the knock sensor generated in the given pre-ignition window may be processed in different ways. For example, signals from the knock sensor generated in the pre-ignition window may be amplified, rectified, band pass filtered, integrated, etc. In one example, similar to that described at 208, output intensity for the pre-ignition window (also termed, pre-ignition intensity) may be determined by aggregating knock sensor output in the pre-ignition window and may be compared to the second threshold. In another example, a frequency of knock sensor signals in the pre-ignition window may be determined via processing. This frequency may be compared to the second threshold, Threshold_PI. Frequency as used herein indicates a number of recurring events, or a number of recurring knock sensor output peaks. In yet another example, average amplitude of the sensor output in the pre-ignition window may be determined and compared to the second threshold.

If the output of the knock sensor in the given pre-ignition window is higher than Threshold_PI, routine 200 progresses to 218 to indicate the presence of LSPI. Further, a LSPI counter may be incremented to track a number of LSPI events (low speed pre-ignition count) that have occurred over the current drive cycle. As such, the pre-ignition count may determine a severity of pre-ignition mitigating actions applied. For example, as the low speed pre-ignition count increases (or exceeds a threshold count), the severity of the applied mitigating action may be increased.

Next, at 220 mitigating actions to counter LSPI are applied. Example mitigating actions may include enriching an affected cylinder, limiting an engine load by reducing air flow into the engine, etc. For example, when alleviating LSPI in an affected cylinder, a degree of enrichment provided to the affected cylinder may be based upon the pre-ignition count. In another example, the pre-ignition count may determine the load clip applied to the engine, the load clip affecting a degree of intake throttle closing. The amount of enrichment or load clip applied in response to the indication of LSPI may be adjusted based on the LSPI count. For example, as the LSPI count (of the cylinder, or the engine) increases (e.g., increases beyond a threshold count), a degree of richness of the enrichment may be increased and/or one or more unaffected cylinders may be enriched in addition to the LSPI affected cylinder. Likewise, an engine load clip may be increased by reducing intake air flow by a larger amount (e.g., by moving the intake throttle further towards a closed position). Engine load may also be limited by reducing boost levels, such as via adjustments to a wastegate or a compressor bypass valve. Mitigating actions for LSPI will be further elaborated in FIG. 3. If the output of the knock sensor in the given pre-ignition window is lower than the second threshold, Threshold_PI, routine 200 continues to 222 to indicate that the engine is operating without LSPI or knock. Routine 200 then ends.

Thus, when pre-ignition determination conditions are met (e.g., engine load is higher than threshold load), and engine speed is lower than the threshold, routine 200 differentiates between knock and LSPI (206-222).

Returning to 204, if the engine speed is determined to be higher than the threshold, routine 200 proceeds to 224 to receive output generated by the knock sensor in a knock window over a first number of engine cycles and in a pre-ignition window over a second number of engine cycles. In one example, the first number of engine cycles may be the same as the second number of engine cycles. Further, the first number of engine cycles and second number of engine cycles may be a common set of engine cycles. In other words, output from the knock sensor may be received for each of the knock window and the pre-ignition window over the same engine cycles. In another example, the first number of engine cycles may be different and distinct from the second number of engine cycles. In yet another example, a portion of the first number of engine cycles may be common to the second number of engine cycles (that is, they may partially overlap).

In one example, an engine cycle may include two revolutions of the crankshaft of the engine. Herein, a single engine cycle may be equivalent to one cylinder cycle for a single cylinder of the engine. To elaborate, the engine cycle includes 720 degrees of crank rotation. During the 720 degrees of crank rotation, a single cylinder of the engine may undergo one cylinder cycle which includes four strokes: an intake stroke, a compression stroke, an expansion stroke, and an exhaust stroke. Further, during the same 720 degrees of crank rotation all cylinders of the engine may complete the four strokes. In another example, an engine cycle may include one revolution of the crankshaft of the engine. Herein, a single cylinder of the engine may complete two strokes within the engine cycle (e.g., 360 degrees of crank rotation).

Next, at 226, for each cylinder, the output from the sensor in the knock window is integrated over the first number of engine cycles while output from the knock sensor in the pre-ignition window is integrated over the second number of engine cycles. Specifically, output intensities in the knock windows for each cylinder may be integrated for the first number of engine cycles. Likewise, output intensities in the pre-ignition windows for each cylinder may be integrated for the second number of engine cycles. As described earlier in reference to FIGS. 5A and 5B, output intensity of a window may be obtained by integrating knock sensor output within the window. Additionally, peak values of the knock sensor output within each window may be monitored. To elaborate, peak values of the sensor output within each knock window may be examined over each of the first number of engine cycles. Similarly, peak values of the output from the knock sensor within each pre-ignition window may be evaluated over each of the second number of engine cycles. As described earlier in reference to FIGS. 5A and 5B, peak values of knock sensor output may be a height of peaks in the knock sensor output within a given window. Further, peak value in a given window may indicate a highest (e.g., maximum) peak value within the given window.

At 228, HSPI is indicated based on one or more of integrated knock sensor output and peak values in the windows over the plurality of engine cycles. For example, integrated knock sensor output (in other words, integrated output intensities) for knock windows over the first number of engine cycles may be analyzed. Similarly, integrated knock sensor output for pre-ignition windows over the second number of engine cycles may be monitored. Specifically, the integrated output intensities for knock windows over the first number of cycles may be contrasted to a third threshold while integrated knock sensor output for pre-ignition windows over the second number of engine cycles may be compared to a fourth threshold. The fourth threshold may be higher than the third threshold. Additionally, peak values in the knock windows may be compared with each other as well as with peak values of the pre-ignition windows over the first and second number of engine cycles. Details of the process to identify HSPI will be further elaborated in reference to FIGS. 6 and 7 below. As described earlier in reference to FIGS. 5A and 5B, the above mentioned comparisons of integrated knock sensor output and peak values may be performed for overlapping as well as non-overlapping knock and pre-ignition windows.

Figure 3:
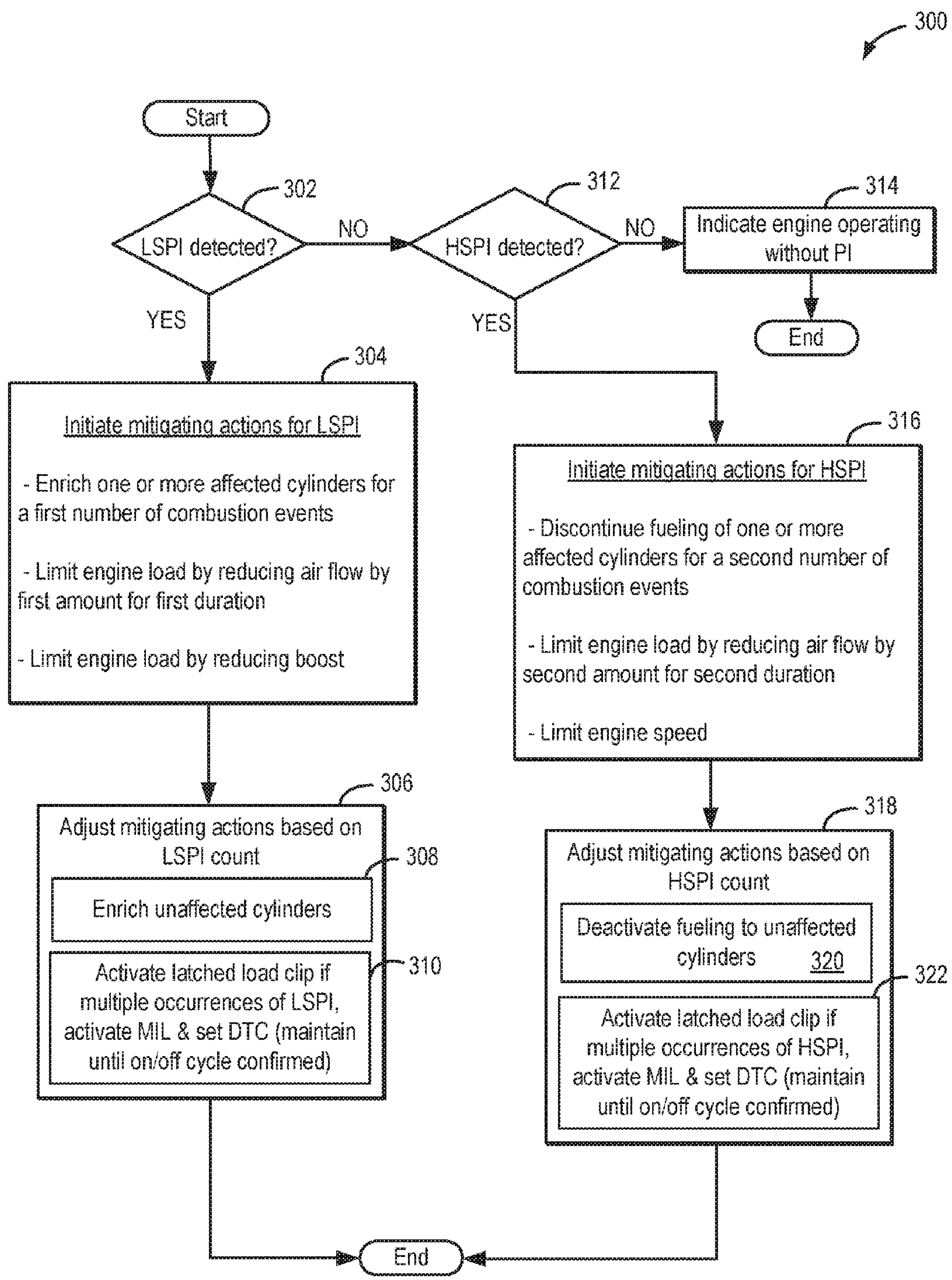
FIG. 3 presents example mitigating actions for each of LSPI and HSPI.

Next, at 230, if HSPI is indicated, various mitigating actions are performed which will be detailed in routine 300 of FIG. 3. For example, HSPI may be alleviated at least partially by selectively deactivating fuel to an affected cylinder. Further still, engine load may be limited. Routine 200 then ends. Thus, when pre-ignition determination conditions are met (e.g., engine load is higher than threshold load), and engine speed is higher than the threshold speed, routine 200 may correlate abnormal combustion events (especially, a transition of combustion event initiation from later timings to earlier timings in an engine cycle) to HSPI. Specifically, a comparison of engine speed to the speed threshold may differentiate HSPI and LSPI (and knock at lower speeds).

In this way, a controller may differentiate between abnormal combustion events due to HSPI, LSPI, and knock. Knock and LSPI may be ascertained based on a combination of engine speed being lower than the threshold speed, engine load higher than the load threshold, and sensor output from an individual knock window and an individual pre-ignition window. For example, LSPI and knock may be detected based on a single engine cycle. Further, knock may be confirmed when knock sensor output in the knock window is compared to a first, lower threshold while LSPI may be indicated in response to knock sensor output in the pre-ignition window being higher than a second, higher threshold. On the other hand, HSPI may be identified based on a combination of engine speed being higher than the threshold speed, engine load being higher than a threshold load, and integrated sensor output from a plurality of knock windows and pre-ignition windows over a duration of multiple engine cycles. In response to the identification of these abnormal combustion events, specific actions may be initiated allowing rapid alleviation of these issues. Mitigating actions to relieve LSPI versus those to reduce HSPI will be elaborated in FIG. 3.

Figure 6:
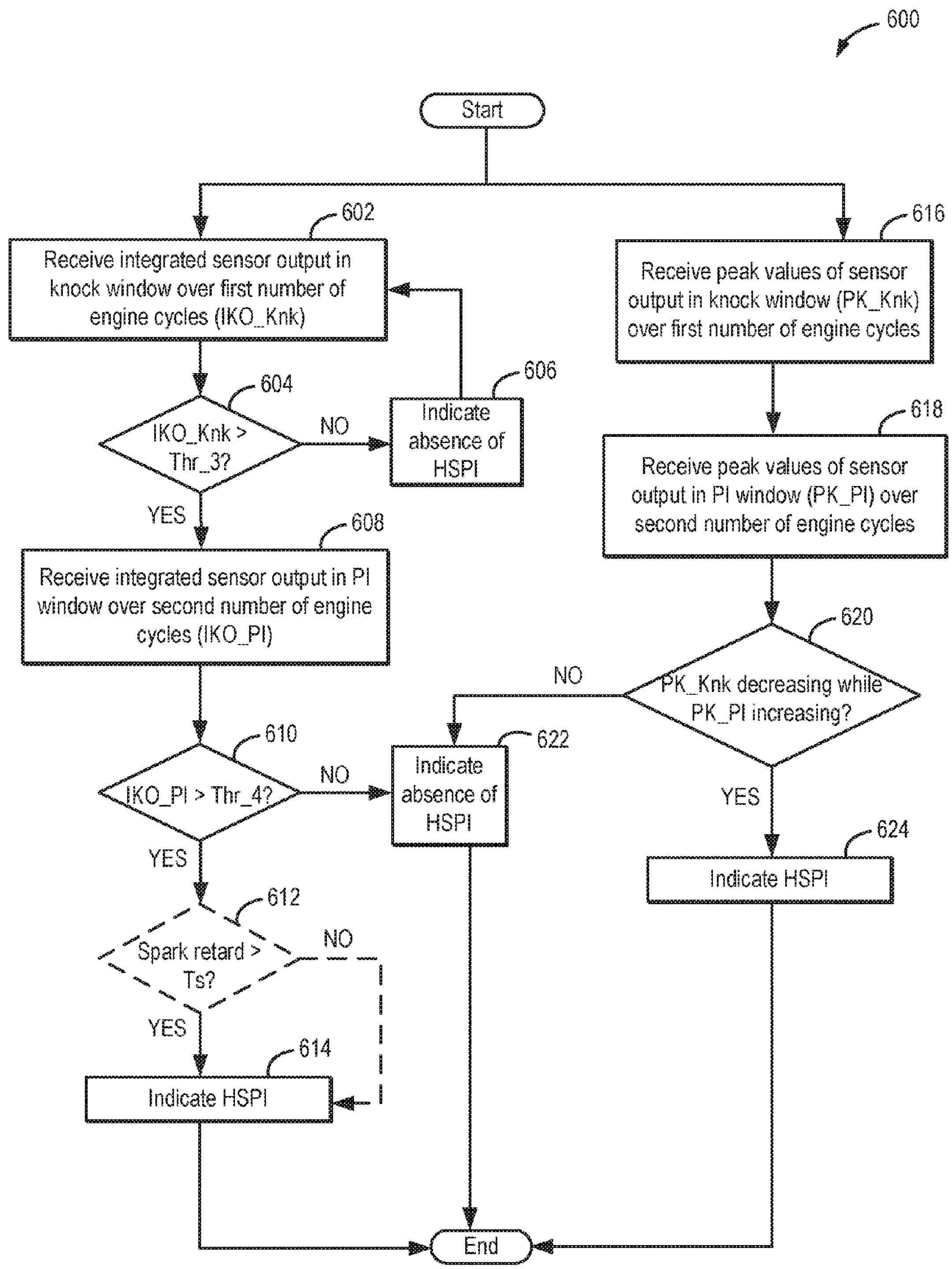
FIG. 6 shows an example routine for determining HSPI when the knock and pre-ignition windows are non-overlapping.

Turning now to FIG. 6, an example routine 600 is presented for detecting presence of HSPI based on knock sensor output in non-overlapping pre-ignition and knock windows. Specifically, HSPI may be recognized by integrating knock sensor output in knock and pre-ignition windows over a plurality of engine cycles and by evaluating peak values within the knock and pre-ignition windows over the plurality of engine cycles. Routine 600 will be described in relation to the engine system shown in FIG. 1 and example knock and pre-ignition windows in FIGS. 4 and 5A, but it should be understood that similar routines may be used with other systems without departing from the scope of this disclosure. Instructions for carrying out routine 600 included herein may be executed by a controller, such as controller 12 of FIG. 1, based on instructions stored on a memory of the controller and in conjunction with signals received from sensors of the engine system, such as the sensors described above with reference to FIG. 1.

Routine 600 depicts the indication of HSPI based on two methods that may occur in parallel. As such, routine 600 may be activated while performing routine 200 of FIG. 2 (e.g., at 228). As will be elaborated below, the controller may be configured to detect HSPI based on integrated knock sensor output over multiple knock and pre-ignition windows (at 602-614) and peak values of knock sensor output in multiple knock and pre-ignition windows (at 616-624) concurrently.

At 602, routine 600 includes receiving integrated sensor output in knock windows over the first number of engine cycles for a given cylinder. Specifically, output intensity (e.g., integrated knock sensor output within a given window over a single engine cycle) in knock windows may be integrated over the first number of engine cycles. As such, an integrated sensor output in knock windows over the first number of engine cycles, IKO_Knk, may be determined. It will be noted that IKO_Knk may also be termed integrated output intensity for knock. Next, at 604, this integrated sensor output in knock windows over the first number of engine cycles is compared to a third threshold, Thr_3. Specifically, routine 600 determines if IKO_Knk is higher than the third threshold at 604. Thus, knock sensor output in knock windows of the first number of engine cycles may be integrated and compared to the third threshold.

If HSPI is present, abnormal combustion events of higher intensity (e.g. amplitude) may occur at a higher frequency (e.g., a number of recurring events) in knock windows during earlier engine cycles. The higher intensity and higher frequency of these events may provide an integrated sensor output in the knock windows that increases over the first number of engine cycles until it is higher than the third threshold. If IKO_Knk is not higher than the third threshold, routine 600 proceeds to 606 to indicate that HSPI is absent. Further, routine 600 returns to 602 to continue receiving integrated sensor output for knock windows over subsequent engine cycles.

However, if it is determined at 604 that IKO_Knk is higher than the third threshold, routine 600 continues to 608 to receive integrated sensor output from pre-ignition windows for the given cylinder over the second number of engine cycles. HSPI may be indicated based on sensor output in both knock and pre-ignition windows over the plurality of engine cycles. Accordingly, after determining that integrated sensor output in knock windows over the first number of engine cycles is higher than the third threshold, the controller also receives integrated sensor output for pre-ignition windows (IKO_PI) over the plurality of engine cycles (e.g., second number of engine cycles) at 608. Specifically, output intensity in pre-ignition windows may be integrated over the second number of engine cycles to generate IKO_PI, also termed integrated output intensity for pre-ignition. It will be noted that knock sensor output in pre-ignition windows may be integrated over the second number of engine cycles only after the integrated sensor output in knock windows over the first number of engine cycles exceeds the third threshold.

Next, at 610, routine 600 determines if the integrated sensor output in pre-ignition windows over the second number of engine cycles is higher than a fourth threshold, Thr_4. If HSPI is present, abnormal combustion events initially occurring in knock windows during earlier engine cycles may gradually transition to pre-ignition windows during later engine cycles. Thus, abnormal combustion events may increase in intensity and frequency in pre-ignition windows during later engine cycles. In response to the rise in intensity and frequency of abnormal combustion events in pre-ignition windows, the integrated sensor output in pre-ignition windows may increase over the second number of engine cycles until it is higher than the fourth threshold.

In one example, the fourth threshold (Thr_4) may be higher than the third threshold (Thr_3) for integrated sensor output in knock windows over the first number of engine cycles. Further still, the fourth threshold for determining HSPI may be different from the second threshold, Threshold_PI, for determining LSPI. Likewise, the third threshold, Thr_3 may be distinct from each of the first threshold, Threshold_KN, for determining knock and the second threshold, Threshold_PI for determining LSPI. In another example, the fourth threshold (Thr_4) may be the same as the third threshold, Thr_3.

It will also be appreciated that the second number of engine cycles that sensor output for pre-ignition windows is integrated over may be based upon a specific duration subsequent to establishing that IKO_Knk is higher than the third threshold. HSPI may be indicated only in response to the integrated knock sensor output in pre-ignition windows increasing to higher than the fourth threshold within the second number of engine cycles.

If it is confirmed at 610 that IKO_PI is not higher than the fourth threshold, routine 600 progresses to 622 to indicate that HSPI is absent. However, HSPI may likely occur and the controller may continue to monitor the integrated sensor output in pre-ignition windows over subsequent engine cycles. Routine 600 then ends. If however it is determined that IKO_PI is higher than the fourth threshold, routine 600 continues to 612 where it may optionally confirm if spark retard for the given cylinder is higher than a threshold spark retard, Ts.

Spark timing may be retarded to mitigate knock which may be detected based on increased abnormal combustion events in knock windows. As such, knock may occur at higher engine speeds and may be alleviated by retarding spark timing. The likelihood of HSPI may be higher if the spark timing is retarded by a higher degree (e.g., a maximum retard clip) in combination with integrated knock sensor output in knock windows exceeding the third threshold over the first number of engine cycles and integrated sensor output in pre-ignition windows exceeding the fourth threshold over the second number of engine cycles. In other words, the simultaneous presence of increased knock intensity and spark retard at the maximum clip may indicate that spark from the spark plug is no longer the ignition source and an alternate source of ignition is present. Accordingly, it may be determined that HSPI may be occurring.

Thus, if it is determined that spark retard in the given cylinder is higher than the threshold spark retard, routine 600 continues to 614 to indicate HSPI. Thus, HSPI may be indicated responsive to an increase in the integrated output in the pre-ignition window following the integrated output in the knock window exceeding a threshold (e.g., Thr_3) and spark timing in the cylinder being retarded by a threshold amount (e.g., Ts). Routine 600 may alternatively proceed to 614 directly from 610 and indicate the presence of HSPI based upon the integrated sensor output in pre-ignition windows over the second number of engine cycles surpassing the fourth threshold at 610. As such, the controller may respond to the indication of HSPI via various remedial actions such as those described at 316 of routine 300.

In parallel to the above, at 616, routine 600 receives peak values of sensor output in each knock window (PK_Knk) of the first number of engine cycles. The peak values may, in one example, be a value of the highest peak (e.g., height of the peak) in the knock sensor output within each knock window. In another example, peak value may be the average value of heights of all peaks in the knock sensor output within each knock window. These peak values for each knock window may be compared over the first number of engine cycles. Next, at 618 routine 600 receives peak values of sensor output in each pre-ignition window (PK_PI) of the second number of engine cycles. In one example, the peak values may be a value of the highest peak (e.g., height of the peak) in the knock sensor output within each pre-ignition window. In another example, peak value may be the average value of heights of all peaks in the knock sensor output within each pre-ignition window. Peak values for each pre-ignition window may be compared over the second number of engine cycles. Further, peak values for the pre-ignition windows in the second number of engine cycles may be compared with peak values for knock windows in the first number of engine cycles.

At 620, routine 600 determines if peak values in the knock windows decrease over the first number of engine cycles with an increase in peak values in the pre-ignition windows over the second number of engine cycles. In one example, the increase in peak values in the pre-ignition windows may follow the decrease in peak values in the knock windows. In another example, the rise in peak values in the pre-ignition windows may be concurrent to the decline in peak values in the knock windows. If yes, routine 600 proceeds to 624 to indicate the presence of HSPI. On the other hand, if it is determined that peak values in the knock windows are not decreasing and/or peak values in the pre-ignition windows are not increasing, routine 600 continues to 622 to indicate that HSPI is absent. As such, routine 600 may continue to monitor knock sensor output in knock and pre-ignition windows for detecting HSPI.

In addition to receiving peak values in knock sensor output in the knock and pre-ignition windows over the plurality of engine cycles, the controller may also monitor a rate of change in knock sensor output within each knock and pre-ignition window. For example, the rate of change in sensor output may include a frequency of the output. Frequency herein implies an incidence or a number of recurring events. In another example, the rate of change may include an amplitude of the output. Herein, HSPI may be indicated in response to a decrease in frequency and/or amplitude of sensor output in knock windows over the first number of engine cycles and an increase in frequency and/or amplitude of sensor output in pre-ignition windows over the second number of engine cycles. For example, the decrease in frequency and/or amplitude of sensor output in knock windows may precede the increase in frequency and/or amplitude of sensor output in pre-ignition windows. In another example, the decrease in frequency and/or amplitude of sensor output in knock windows may occur simultaneously with the increase in frequency and/or amplitude of sensor output in pre-ignition windows.

Figure 7:
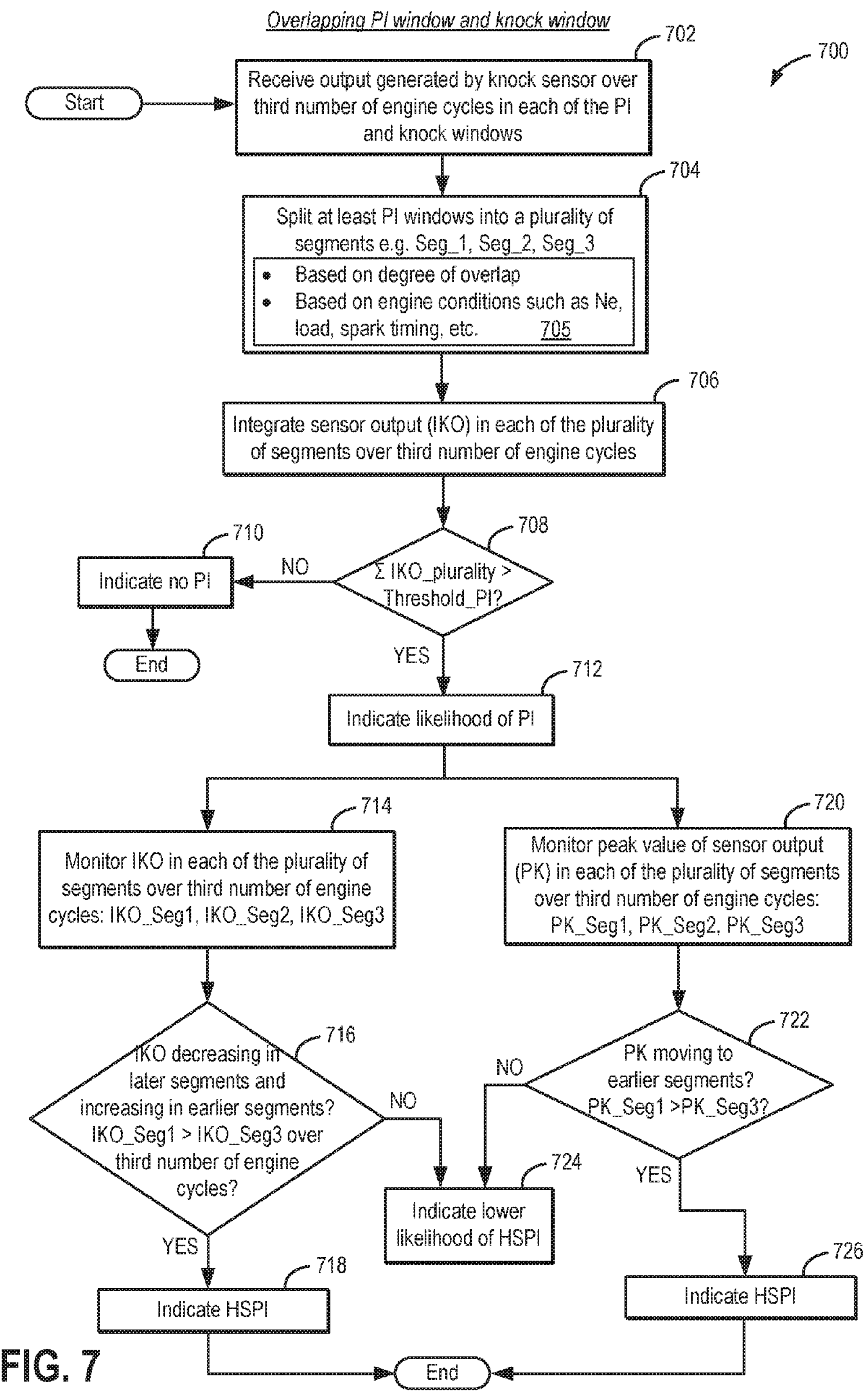
FIG. 7 is an example routine for determining HSPI when the knock and pre-ignition windows are at least partially overlapping.

FIG. 7 depicts an example routine 700 for detecting HSPI events based on knock sensor output in overlapping knock and pre-ignition windows. Specifically, the routine includes comparing and contrasting knock sensor output in a plurality of segments in pre-ignition windows. Routine 700 will be described in relation to the engine system shown in FIG. 1 and example knock and pre-ignition windows in FIGS. 4 and 5B, but it should be understood that similar routines may be used with other systems without departing from the scope of this disclosure. Instructions for carrying out routine 700 included herein may be executed by a controller, such as controller 12 of FIG. 1, based on instructions stored on a memory of the controller and in conjunction with signals received from sensors of the engine system, such as the sensors described above with reference to FIG. 1.

At 702, routine 700 receives output from a knock sensor for a plurality of overlapping knock and pre-ignition windows for a given cylinder. Specifically, knock sensor output may be received for knock and pre-ignition windows in a third number of engine cycles. As an example, the third number of engine cycles may be a combination of the first number of engine cycles and the second number of engine cycles. In another example, the third number of engine cycles may be the same as either the first number of engine cycles or the second number of engine cycles. In yet another example, the third number of engine cycles may be different and distinct from each of the first and the second number of engine cycles.

At 704, routine 700 divides at least the pre-ignition window in each engine cycle into a plurality of segments (as shown in map 450 of FIG. 4, and described in reference to FIG. 5B). As such, at 705, the number of segments that each pre-ignition window is divided into depends on a degree of overlap between the pre-ignition window and the knock window in each engine cycle. For example, if the degree of overlap is higher, the pre-ignition windows may be split into a higher number of segments. Contrarily, if the amount of overlap between the knock and pre-ignition window is smaller, the pre-ignition window may be split into fewer segments. Further, the number of segments that the pre-ignition window is divided into may also vary with an increase in the number of engine cycles. The plurality of segments that the pre-ignition window is split into may additionally or optionally be based upon existing engine conditions such as engine speed (Ne), engine load, spark timing, etc. For example, the pre-ignition window may be split into a higher number of segments if the engine speed is higher. In alternate examples, the knock window may be divided into segments instead of splitting the pre-ignition window.

In yet another example, the number of segments that the pre-ignition window is split into may also be based upon the first threshold (Threshold_KN) and the second threshold (Threshold_PI). For example, if the first threshold and the second threshold are close to each other, the pre-ignition window may be split into a higher number of segments. In another example, if the first threshold and the second threshold are separated by a wider margin, the pre-ignition window may be divided into fewer segments.

Routine 700 then proceeds to 706 to integrate sensor output in each of the plurality of segments over the third number of engine cycles. Accordingly, an integrated sensor output (IKO) or output intensity is generated for each of the plurality of segments over the third number of engine cycles. Further, at 708, routine 700 determines if a sum of the integrated sensor output (IKO) of the plurality of segments in a given engine cycle is higher than the second threshold, Threshold_PI. If no, routine 700 continues to 710 to indicate that pre-ignition is absent. Routine 700 then ends. If, on the other hand, the sum of integrated sensor output in the plurality of segments for the given engine cycle is higher than Threshold_PI, routine 700 progresses to 712 to indicate a likelihood of pre-ignition.

Routine 700 then proceeds to confirm the presence of HSPI by one or both of methods described earlier in reference to FIG. 6. As in routine 600, the controller may be configured to detect HSPI based on integrated knock sensor output over multiple segments in pre-ignition windows (at 714-718) and peak values of knock sensor output in multiple segments of pre-ignition windows (at 720-726) concurrently.

At 714, routine 700 includes analyzing integrated sensor output in each segment of the plurality of pre-ignition windows over the third number of engine cycles. As shown in map 550 of FIG. 5B, sensor output in each segment (e.g., first segment 501, second segment 503, third segment 505) of each pre-ignition window may be integrated to generate an integrated sensor output such as IKO_Seg1, IKO_Seg2, etc. Next, at 716, routine 700 assesses whether integrated sensor output (IKO) in later segments is decreasing while integrated sensor output in earlier segments is increasing over the third number of engine cycles. Referring to FIG. 5B, it may be determined if IKO in third segment 505 (e.g., a later segment) decreases from engine cycle 'p' to engine cycle 'p+1'. At the same time, the controller may determine if IKO in earlier segments, such as first segment 501, is increasing from engine cycle 'p' to engine cycle 'p+1'.

Thus, the comparison of IKO in the multiple segments of the pre-ignition windows over the plurality of engine cycles includes examining an advancing of IKO from later segments to earlier segments over the plurality of engine cycles. To elaborate, IKO in later segments may be higher than those in earlier segments for each pre-ignition window initially, such as during an earlier portion of the plurality of engine cycles. As the engine cycles continue to occur, IKO in later segments may gradually decrease while IKO in earlier segments within the corresponding pre-ignition windows increases. This transition of higher IKO from later segments in a segmented pre-ignition window to a higher IKO in earlier segments of the segmented pre-ignition window may indicate earlier initiation of combustion and, thereby indicate HSPI.

In another example, the IKO in each segment may be compared to a threshold, such as fourth threshold (Thr_4) to determine the presence of HSPI. The IKO in each segment may be compared to the same threshold, such as the fourth threshold. HSPI may be indicated based on the IKO of later segments being higher than the fourth threshold during the earlier portion of the plurality of engine cycles, followed by a decrease in IKO of later segments to lower than the fourth threshold in the later portion of the plurality of engine cycles. At the same, the IKO of earlier segments during the earlier portion of the plurality of engine cycles may be lower than the fourth threshold but may increase subsequently to higher than the fourth threshold during the later portion of the plurality of engine cycles.

If it is confirmed that IKO is not decreasing in the later segments and/or IKO is not increasing in the earlier segments, routine 700 continues to 724 to indicate that the likelihood of HSPI is lower. However, if the IKO is increasing in earlier segments while simultaneously decreasing in later segments over the third number of engine cycles, routine 700 progresses to 718 to indicate the presence of HSPI. Routine 700 then ends.

In parallel to the above, at 720 routine 700 receives and monitors peak values of sensor output (PK) in each of the plurality of segments over the third number of engine cycles. As shown in map 550 of FIG. 5B, peak values of sensor output in each segment (e.g., first segment 501, second segment 503, third segment 505) of each pre-ignition window may be evaluated. Peak values, as explained earlier, may include a height of the highest peak in the knock sensor output within a segment of a given pre-ignition window. Alternatively, peak value may be an average of the heights of all peaks within the segment of the given pre-ignition window. Next, at 722, routine 700 determines if peak values are transitioning from later segments to earlier segments over the third number of engine cycles.

If HSPI is present, peak values in later segments may be higher initially than corresponding peak values in earlier segments. Specifically, peak values in later segments may be higher during an earlier number of the plurality of engine cycles. Further, as the number of engine cycles increases, peak values in the later segments may undergo a gradual decrease while peak values in the earlier segments of the same pre-ignition windows experience a gradual increase concurrently. Thus, in one example, highest peak values may advance from later segments to earlier segments over the course of the third number of engine cycles indicating an advancement of initiation of combustion in the engine cycle.

Therefore, if it is confirmed that peak values are transitioning from later segments to earlier segments over the third number of engine cycles, routine 700 proceeds to 726 to indicate presence of HSPI. On the other hand, if peak values are not transitioning from later segments to earlier segments, routine 700 proceeds to 724 to indicate that the likelihood of HSPI is lower. Routine 700 then ends.

In this manner, abnormal combustion events may be categorized as HSPI events based on evaluation of knock sensor output in overlapping as well as non-overlapping knock and pre-ignition windows over a plurality of engine cycles. HSPI may be more accurately identified based on knock sensor output by using one or both methods described above enabling a specific mitigating action. Further, by identifying HSPI and applying desired remedies, a likelihood of runaway pre-ignition may be reduced.

FIG. 3 includes an example routine 300 illustrating distinct mitigating actions for LSPI and HSPI. As such, routine 300 will be described in relation to the engine system shown in FIG. 1, but it should be understood that similar routines may be used with other systems without departing from the scope of this disclosure. Instructions for carrying out routine 300 included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1 to adjust engine operation and perform mitigating actions, according to the routines described below.

At 302, routine 300 determines if LSPI is detected. As described earlier in reference to 218 of routine 200, LSPI may be indicated based on engine speed being lower than the threshold as well as sensor output in the pre-ignition window being higher than Threshold_PI. If LSPI is detected, routine 300 moves to 304 to initiate mitigating actions for LSPI. Therein, in response to an indication of LSPI, the controller enriches the affected cylinder(s) for a first number of combustion events. The enriching may include increasing a degree of richness of cylinder enrichment. For example, an amount of fuel injection delivered via a direct and/or port injector into the affected cylinder(s) may be increased to operate the cylinder richer than stoichiometry, at the determined enrichment level, for one or more engine cycles. Herein, the controller may communicate a signal to fuel injector(s) coupled to the affected cylinder(s) to increase fueling of the corresponding cylinder(s), e.g., by increasing a pulse width of the fuel injector(s). In addition, a number of injections via which the fuel is delivered may be increased. For example, the fuel may be delivered as multiple intake stroke injections or multiple compression stroke injections, or a combination thereof. Further still, a timing of the injection may be adjusted. For example, a portion of the fuel may be delivered in the intake stroke while a remaining portion of the fuel may be delivered in a compression stroke of the cylinder while varying (e.g., advancing or retarding) an overall fuel injection timing.

The affected cylinder(s) may be enriched for a specific number of combustion events (e.g., a first number of enriched combustion events). The number of combustion events that the affected cylinder is enriched for may depend, in one example, on an intensity of LSPI.

Further still, the degree of enrichment as well the number of combustion events for which the cylinder is enriched may be adjusted based on the pre-ignition count of the cylinder (and/or of the engine). For example, as the pre-ignition count increases, the number of cylinder enrichment events and the degree of richness may be increased. In addition, cylinder enrichment may be extended to one or more pre-ignition unaffected cylinders so as to pre-empt pre-ignition being induced in the unaffected cylinders.

In addition to enriching the affected cylinder, a limit or clip is applied to engine load to mitigate the LSPI. Specifically, a first amount of load limit may be applied on the engine for a first duration. By limiting the engine load, however, torque production may be transiently reduced. As used herein, limiting the engine load may include limiting air flow into one or more cylinders of the engine. Intake air flow may be reduced by one or more of reducing an opening of an intake throttle, adjusting a cylinder valve timing to reduce an intake aircharge, and increasing an opening of a wastegate coupled across the exhaust turbine. For example, a control signal may be sent from the controller to an electromechanical actuator coupled to a throttle plate of the intake throttle. Specifically, the electromechanical actuator may rotate the throttle plate of the intake throttle to a more closed position from a more open position to reduce intake air flow. The controller may also communicate with the cam actuation systems to adjust valve timings of the affected cylinders to reduce intake air charge. As an example, a duration of intake valve opening may be decreased by adjusting valve timings. Alternatively, the controller may provide a signal to an electromechanical actuator coupled to the wastegate to adjust the wastegate to a more open position from a more closed position to increase exhaust bypass flow and reduce boost pressure, thereby limiting engine load.

The first load limit may be applied for a first duration such as a specific number of combustion events, a certain number of engine cycles, a duration of time, etc. Further, the first load limit as well the number of engine cycles for which the engine load is limited may be adjusted based on the pre-ignition count of the cylinder (and/or of the engine). For example, as the pre-ignition count increases, intake air flow may be further reduced, and the engine load may be lowered further. In addition, load limiting may be applied for a larger number of engine cycles.

Next, at 306, routine 300 adjusts the mitigating actions based on a count of LSPI events. For example, if the LSPI count is higher than a threshold number, a degree of cylinder enrichment may be increased. Additionally, the first amount of load limiting may be increased. Further still, if LSPI is not alleviated within the first number of combustion events, the controller commences enriching cylinders unaffected by LSPI at 308. Thus, cylinders that do not experience LSPI may also receive an increased degree of cylinder enrichment. In addition, at 310, based on the LSPI count increasing to higher than the threshold number, the load limit is maintained active and "latched" until an engine-on/off cycle or key-on/off cycle is confirmed. As such, when load limiting is applied to the engine, engine power may be reduced. Thus, when applying the more restrictive load limit, an associated warning may be delivered to the vehicle operator to warn them of the reduced power state. Accordingly, a malfunction indicator lamp (MIL) may be activated when the load limit is latched and a diagnostic trouble code (DTC) may be enabled.

Returning to 302, if it is determined that LSPI is not detected, routine 300 continues to 312 to confirm if HSPI is indicated. As mentioned earlier in routine 200, HSPI may be identified based on a combination of engine speed being higher than a threshold (e.g., a speed threshold), engine load being higher than a load threshold, and integrated knock sensor output and/or peak values in pre-ignition and knock windows over multiple engine cycles. If HSPI is not detected, routine 300 continues to 314 to indicate that abnormal combustion events are not detected and the engine is operating without either LSPI or HSPI. Routine 300 then ends. However, if HSPI is confirmed at 312, routine 300 progresses to 316 to initiate mitigating actions for HSPI.

For example, HSPI may be alleviated by ceasing fuel supply to the affected cylinder(s) for a second number of combustion events. Herein, fuel injection into the affected cylinder(s) via the direct and/or port injector may be stopped. The controller may communicate a signal to fuel injector(s) coupled to the affected cylinder(s) to cease fueling.

Fuel supply into the affected cylinder(s) may be discontinued for a specific number of combustion events (e.g., the second number of combustion events). As such, fuel supply may be resumed after the completion of the second number of combustion events. The second number of combustion events may depend, in one example, on an intensity of HSPI. Alternatively, a counter of HSPI events may establish the second number of combustion events. It will be noted that the second number of combustion events (that fuel supply to affected cylinders is ceased) may be distinct from the first number of combustion events that the affected cylinder is enriched in response to LSPI. For example, the first number of combustion events that cylinders affected by LSPI receive enrichment for may be smaller relative to the second number of combustion events that the cylinders affected by HSPI do not receive fuel supply. In other words, HSPI may be mitigated by terminating fuel supply to the affected cylinder for a larger number of combustion events relative to the number of combustion events that the cylinder affected by LSPI is enriched.

In addition to discontinuing fuel supply to cylinders affected by HSPI, the engine may also operate with a limited load for a second duration. As such, engine load may be limited by a second amount, the second amount different and distinct from the first amount of load limiting applied to remedy LSPI. For example, the second amount of load limit may be higher than the first amount of load limit. In other words, the second amount of load limit applied in response to HSPI may be more restrictive than the first amount of load limit applied in response to LSPI, and intake air flow may be reduced more in the second load limit as compared to the first load limit. Further still, the second amount of engine load limit may be applied for a second duration to alleviate HSPI. The second duration may be the second number of combustion events. The second duration may be longer than the duration that the first amount of load limit applied in response to LSPI. In other words, the engine may be operated with a higher load limit for a longer duration in response to HSPI relative to engine operation in response to LSPI.

Engine speed may also be limited in response to indication of HSPI. For example, an available maximum engine speed may be clipped when HSPI is detected. In one example, engine speed may be limited by reducing intake air flow. In another example, a pulse width of a fuel injector may be reduced.

It will be noted that in response to HSPI being mitigated, fuel supply may be restored and the engine may be operated without load limits or speed limits. In another example, engine load limiting may be removed after the second duration is completed (e.g., after the second number of combustion events are concluded) and fuel supply into the affected cylinder may be restarted. In other words, engine load may be resumed after HSPI is mitigated. Mitigating actions for HSPI (or LSPI) may also be ceased in response to a reduction in engine load. In one example, fuel supply to the HSPI affected cylinder may be restored responsive to a reduction in torque demand (e.g., a tip-out). As such, pre-ignition events are less likely when engine load is lower than the threshold load. Accordingly, a change in engine operating conditions to lower loads may terminate any ongoing HSPI mitigation actions.

Next, at 318, a severity of the mitigating actions in response to HSPI is adjusted based on a count of HSPI events. For example, if the HSPI count is higher than a threshold number for HSPI events, the controller ceases fuel supply to at least a portion of cylinders unaffected by HSPI at 320. Thus, cylinders that do not experience HSPI may experience termination of fuel supply therein. In another example, the engine may be operated with a higher amount (e.g., higher than the second amount) of load limiting in response to the HSPI count being higher than the threshold number of HSPI events.

Further, at 322, in response to multiple recurrences of HSPI (e.g., higher than the threshold number for HSPI events), the engine load limit is maintained active and "latched" until an engine-on/off cycle or key-on/off cycle is confirmed. Further still, the MIL may be activated when the load limit is latched and a separate DTC (e.g., distinct from that for LSPI) may be enabled.

In this manner, each of LSPI and HSPI may be eased to reduce engine degradation due to pre-ignition. While LSPI may be alleviated by enriching one or more affected cylinders, HSPI may be moderated by terminating fuel supply to the affected cylinders. As such, discontinuing fuel supply to the affected cylinders may bring about a faster reduction in HSPI. Further, each of LSPI and HSPI may be mitigated by limiting engine loads. However, a higher amount of load limiting may be applied to the engine in response to HSPI than that for LSPI. Accordingly, engine torque production may be considerably reduced while responding to HSPI events.

Thus, an example method for an engine may comprise indicating low speed pre-ignition based on knock sensor output assessed in each of a knock window and a pre-ignition window, and indicating high speed pre-ignition based on an integrated knock sensor output, integrated over a number of engine cycles, in each of the knock window and the pre-ignition window. The method may further comprise, in response to the indication of low speed pre-ignition, enriching an affected cylinder and reducing engine intake air flow by a first amount, and in response to the indication of high speed pre-ignition, deactivating fuel to the affected cylinder and reducing engine intake air flow by a second amount, the second amount higher than the first amount. Further, in response to the indication of low speed pre-ignition, the affected cylinder may be enriched for a first, smaller number of combustion events, and wherein in response to the indication of high speed pre-ignition, fuel may be deactivated in the affected cylinder for a second, larger number of combustion events.

Now turning to FIG. 8, a schematic block diagram 800 illustrating engine load-limiting adjustments is shown. Limiting of engine loads may be based on an output of the knock sensor generated in each knock window and each pre-ignition window over a plurality of engine cycles. The routine may start with a feed-forward portion of load limiting 802 wherein load limiting is performed in anticipation of pre-ignition (e.g., LSPI, HSPI) and taking into account various other load restricting conditions and load demands 804. Specifically, a first controller K1 may determine load limits based on engine operating conditions, such as based on an engine speed-charge temperature condition at 802, and may also determine load limits corresponding to one or more load constraining conditions (or "features") and load demands. These may include, for example, load limits for providing appropriate traction control (e.g., a load limiting responsive to wheel slip), other load demands, etc. The controller may select the lowest of all the load limits assessed to be a nominal load limit, or Tqe_load_limit 806, wherein this lowest load limit is applied in anticipation of pre-ignition.

The load limit may then be clipped with a load clip 808. The load clip may be based on various factors. In one example, the controller may start with a nominal load clip that is based on nominal conditions. This nominal load clip may be provided (e.g., read from a 2D map) as a function of engine speed and manifold charge temperature. The load clip may then be adjusted by a multiplication factor that ranges from −1 to 1. The factor may be based on feed-forward measurements such as fuel octane content, fuel ethanol or alcohol content, air-to-fuel ratio, engine LSPI count, and engine HSPI count. Thus, a lean air-to-fuel ratio or a low octane fuel that will make the probability of pre-ignition go higher results in a load clip wherein the interpolation of the load clip moves the load limit to a lower value (such as a low effect pre-ignition mitigation value). In another example, a rich air-to-fuel ratio or a high octane content of the fuel may result in a higher load limit (such as a high effect pre-ignition mitigation value). The torque load limit is then arbitrated with the load clip to determine an arbitrated torque load limit 810.

The load clip also includes the feedback portion of pre-ignition load limiting, wherein the load limit is further adjusted based on a learned LSPI and HSPI rate or count, as counted by LSPI counter 818 and HSPI counter 828. The count of LSPI and HSPI events may be determined based upon knock sensor output in each of a knock window and a pre-ignition window. Specifically, controller K2 receives inputs regarding engine speed, Ne, and signals from a knock sensor, such as knock sensor 90 of FIG. 1, and processes these inputs to provide a knock sensor output in a pre-ignition window, KO_PI_window 814, and a knock sensor output in a knock window, KO_KNK_window 816. Knock sensor output in each knock window and each pre-ignition window is then utilized to detect LSPI events (based on comparing knock sensor output in a pre-ignition window with the second threshold, Threshold_PI) and HSPI events. LSPI counter 818 tracks a count of LSPI events and supplies the count to the load clip at 808. Further, knock sensor output from each knock and pre-ignition window may be fed to each of controller K3 and K4. Controller K3 determines HSPI events based on integrated knock sensor output (IKO) in each knock and pre-ignition window at 820 over a plurality of engine cycles. Meanwhile, controller K4 detects HSPI events based on peak values in knock sensor output (PK) in each knock and pre-ignition window at 822. HSPI counter 824 tracks a count of HSPI events and provides the HSPI count to the load clip at 808.

Once a threshold number of pre-ignition events (whether LSPI or HSPI) is reached, a respective pre-ignition counter may be activated and may start to determine a pre-ignition rate. Thus, if the LSPI counter estimates that a threshold number of LSPI events is reached, a LSPI rate 830 may be determined. On the other hand, if the HSPI counter determines that a threshold number of HSPI events is attained, a HSPI rate 826 may be assessed. If the pre-ignition rate is higher, a respective pre-ignition load limit may be calculated. For example, if the rate of LSPI is higher, LSPI_load_limit 834 may be estimated. In another example, if the rate of HSPI is higher, HSPI_load_limit 828 may be evaluated. Thus, the LSPI counter and the HSPI counter may function in parallel with each other.

Controller K5 may then select the desired load limit 838 to be the lowest of these load limits. Thus, the desired load limit may be the lowest of the arbitrated load limit, the LSPI load limit, and the HSPI load limit. As elaborated earlier in reference to FIG. 3, the HSPI load limit may be higher (e.g., more restrictive) than the LSPI load limit.

Referring now to FIG. 9, it includes map 900 illustrating an example detection and mitigation of LSPI and HSPI using knock sensor output in non-overlapping knock and pre-ignition windows for a single cylinder in an engine. As such, map 900 will be described in relation to the example engine system shown in FIG. 1 as well as example sensor output in knock and pre-ignition windows of FIGS. 4 and 5A.

Map 900 depicts a pre-ignition flag at plot 902, an opening of an intake throttle at plot 904, fueling of the single cylinder at plot 906, integrated knock sensor output (IKO) in a knock window at plot 908, integrated knock sensor output in a pre-ignition (PI) window at plot 910, sensor output from a knock sensor in the knock window at plot 912, sensor output in the PI window at plot 914, and engine speed at plot 916. Integrated knock sensor output as described earlier includes integrating sensor output in each knock and each pre-ignition window. Further, plots 908 and 910 represent changes in the integrated knock sensor output as the number of engine cycles increases with time along the x-axis. Accordingly, plots 908 and 910 present integrated knock sensor output values for respective knock and pre-ignition windows over multiple engine cycles. Sensor output in each knock and PI window as shown in plots 912 and 914, respectively, includes an example sensor output depicting peaks in the sensor output. Line 907 represents the third threshold, Thr_3, of routine 600 while line 909 represents the fourth threshold, Thr_4 of routine 600. Line 911, represents the first threshold, Threshold_KN, for detecting knock, line 913 represents the second threshold, Threshold_PI, for detecting LSPI and line 915 represents a threshold speed for determining LSPI and HSPI. All plots are shown over time, along the x-axis. Further, time increases from the left of the x-axis towards the right and may also indicate an increase in the number of engine cycles. Note that elements aligning at a common time on the graph, such as at time t1, for example, are occurring concurrently, including for example where one parameter is increasing while another parameter is decreasing.

At t0, the engine may be operating at a speed lower than the threshold speed (line 915) with the opening of the intake throttle at a lower amount. As such, intake air flow entering the engine (and the cylinder) may be lower. Further, the single cylinder may receive a smaller amount of fuel based on the existing engine speed and other engine conditions, as shown by plot 906. Further, the engine may be operating without pre-ignition, as depicted by the PI flag (plot 902) and sensor outputs in plots 912 and 914.

At t1, knock sensor output in the pre-ignition window rises above the pre-ignition (second) threshold (line 913). In response to the sensor output being higher than the pre-ignition threshold with the engine operating at lower speeds, the PI flag indicates LSPI at t1. In response to the indication of LSPI, a controller may enrich the cylinder. Accordingly, fueling of the affected cylinder is increased at t1. In one example, fueling of the affected cylinder may be increased by increasing a pulse width of a fuel injector delivering fuel into the affected cylinder. In addition to enriching the affected cylinder, the controller may also limit engine loads. Engine load may be limited by reducing the opening of the intake throttle at t1 (plot 904) thereby decreasing the amount of intake air flowing into the engine. Thus, the intake throttle may be adjusted from a position that is more open to a position that is more closed.

In response to these mitigating actions, LSPI may subside, as shown by sensor output in the pre-ignition window remaining below the pre-ignition threshold between t1 and t3. At t2, engine speed may increase to above the threshold speed (line 915). As an example, engine speed may rise in response to a sudden increase in operator torque demand. For example, the vehicle may be ascending an incline. In another example, the vehicle may be accelerating to merge with other vehicles on a highway. In order to produce the desired engine speed, cylinder fueling may be adjusted and the opening of the intake throttle may be altered. As shown, the cylinder may receive a higher amount of fuel relative to the amount of fuel received at t0 (at lower engine speeds). Further, the amount of fuel received in response to the increase in engine speed may be lower than that received for cylinder enrichment responsive to LSPI. In addition to adjusting the fueling of the cylinder, the opening of the intake throttle may be increased significantly at t2 to enable a higher intake air flow into the engine.

As the engine continues to operate at higher engine speeds, output from the knock sensor in each knock window and pre-ignition window may be monitored. Between t2 and t3, sensor output in the later, knock windows includes multiple high peaks while output of the knock sensor in the earlier, pre-ignition windows shows lower peaks (or peak values). Specifically, peak values in the later, knock windows may be higher than the knock threshold (line 911) while peak values in the earlier, pre-ignition windows may be lower than the pre-ignition threshold (line 913). As such, abnormal combustion events may be observed in later, knock windows.

Sensor output in the knock windows may be integrated over multiple engine cycles to yield the integrated knock sensor output shown in plot 908. As shown, integrated knock sensor output in knock windows rises progressively after t2 and reaches the third threshold (line 907) at t3. For further clarification of the variation in integrated knock sensor output, regions 901 and 903 are indicated depicting the increase in integrated output intensity of knock windows. Specifically, region 901 occurs earlier than region 903. Further, area of region 903 is greater than area of region 901 since abnormal combustion events are higher (e.g., higher intensity, higher frequency, etc.) in knock windows as engine cycles increase. Further still, as the intensity of abnormal combustion events in knock windows increases, so does the integrated sensor output in knock windows. In comparison, integrated sensor output in pre-ignition windows between t2 and t3 is considerably lower.

Once the integrated sensor output in the knock windows reaches the third threshold at t3, the controller may monitor integrated sensor output in pre-ignition windows for a duration 'D'. As such, duration 'D' may be a specific number of combustion events, a number of engine cycles, etc. Sensor output in the pre-ignition windows after t3 includes an increase in the number of peaks as well as peak values. Consequently, the integrated sensor output in pre-ignition windows begins to increase steadily after t3 and attains the fourth threshold (line 909) by duration 'D' at t4. For further clarification of the variation in integrated knock sensor output in the pre-ignition windows after t3, regions 921 and 923 are shown depicting the increase in integrated output intensity of pre-ignition windows over a plurality of engine cycles following the rise in integrated knock sensor output. Specifically, area of region 923 is greater than area of region 921 indicating that abnormal combustion events are escalating in pre-ignition windows as the number of engine cycles is increasing. Further, area of region 923 is also greater than area of region 903 signifying that abnormal combustion events transitioning from knock windows into pre-ignition windows. Furthermore, the combustion events in pre-ignition windows may be of higher intensity at a higher frequency than prior to t3. In comparison, integrated sensor output in knock windows between t3 and t4 begins to decrease. Region 905 under plot 908 denotes the reduction in integrated output intensity of the knock windows as the number of engine cycles increases. Herein, region 905 under plot 908 is smaller than region 903. Herein, integrated knock sensor output in knock windows may rise above a threshold (e.g., Thr_3) followed by integrated knock sensor output in pre-ignition windows rising above a distinct threshold (e.g., Thr_4).

It will also be noted that peak values (e.g., peak heights) in sensor output in the knock windows between t2 and t4 are decreasing (as indicated by dashed line 917) while peak values (e.g., peak heights) in sensor output in the pre-ignition windows is simultaneously increasing (as indicated by dashed line 919).

Thus, HSPI may be indicated responsive to one or more of an increase in the integrated output in the knock windows followed by an increase in the integrated knock sensor output in the pre-ignition windows, and a decrease in a peak value of the output of the knock sensor in the knock windows with an increase in the peak value of the output of the knock sensor in the pre-ignition windows (while engine speed is higher than the threshold, line 915). Accordingly, at t4, the PI flag indicates HSPI. In response to identification of HSPI, various mitigating actions may be initiated. Thus, at t4, fueling of the cylinder is discontinued (plot 906) and engine load may be limited by reducing intake air flow into the engine. Specifically, intake air flow may be reduced by decreasing the opening of the intake throttle (plot 904). It will be appreciated that the opening of the intake throttle may be reduced to a higher degree (T_H) in response to HSPI relative to the decrease in opening of the intake throttle in response to LSPI (T_L). In other words, engine load limiting in response to HSPI may be more restrictive than that for LSPI. The reduction in intake air flow may also limit engine speed. As shown between t4 and t5, engine speed reduces to that of the threshold speed (or lower) in response to the decrease in intake air flow.

Between t4 and t5, HSPI may subside in response to the various mitigating actions as indicated by the reduced peak values, as well as decrease in integrated knock sensor output, in each of the knock and pre-ignition windows. In one example, the duration between t4 and t5 may be a pre-determined number of combustion events. Therefore, at t5, actions to alleviate HSPI may be terminated. At t5, fueling of the cylinder may be restored while simultaneously eliminating the limit on engine load. Accordingly, the cylinder may receive fuel at t5, and the opening of the intake throttle may be increased at t5 as the engine returns to operate at higher engine speeds. Accordingly, the engine may receive a higher intake air flow and engine load limiting may be removed in response to mitigation of HSPI.

Thus, LSPI and HSPI may be differentiated based upon engine speed and knock sensor output in knock and pre-ignition windows. Each variety of pre-ignition may be mitigated using distinct remedial actions.

Referring now to FIG. 10, it includes map 1000 illustrating an example detection of HSPI using knock sensor output in overlapping knock and pre-ignition windows for a single cylinder in an engine. As such, map 1000 will be described in relation to the example engine system shown in FIG. 1 as well as example sensor output in knock and pre-ignition windows of FIGS. 4 and 5B. As in the example of FIG. 5B, the pre-ignition window may be split into three segments: a first segment Seg_1, a second segment Seg_2, and a third segment Seg_3. The first segment may be termed an earlier segment relative to each of the second segment and the third segment. Further, the third segment may be termed a later segment relative to each of the first segment and the second segment.

Map 1000 depicts fueling of the single cylinder at plot 1002, an HSPI flag at plot 1004, sensor output from a knock sensor in the first segment of the pre-ignition window at plot 1006, sensor output from the knock sensor in the second segment of the pre-ignition window at plot 1008, sensor output from the knock sensor in the third segment of the pre-ignition window at plot 1010, and engine speed at plot 1012. Plots 1006, 1008, and 1010 present changes in the knock sensor output in the different segments as the number of engine cycles increases with time along the x-axis. Line 1009 represents a threshold speed for determining HSPI. All plots are shown over time, along the x-axis. Further, time increases from the left of the x-axis towards the right and may also indicate an increase in the number of engine cycles. Note that elements aligning at a common time on the graph, such as at time t1, for example, are occurring concurrently, including for example where one parameter is increasing while another parameter is decreasing.

Between t0 and t1, the engine may be operating with a lower engine speed and abnormal combustion events may not be present, as indicated by the low peak values of sensor output in each segment. Further, the cylinder may be fueled with a lower amount of fuel based on existing engine conditions. At t1, a sudden rise in engine speed may occur whereupon engine speed may increase to higher than the threshold speed (line 1009). In response to the increase in engine speed and other conditions, fueling of the cylinder may increase. Further, knock sensor output in the various segments of the pre-ignition window may change with the rise in engine speed.

Immediately after t1, sensor output in the third, later segments of the pre-ignition window may include multiple peaks with higher peak values. At the same time, sensor output in the second, middle segments of the pre-ignition window may include medium peaks with moderate peak values while the first, earlier segments of the pre-ignition window may include fewer peaks, wherein the peaks have considerably lower peak values. As the number of engine cycles increases with time, a change in peak values across the segments may be observed if HSPI is present. Between t1 and t2, for example, peak values in the second, middle segment of the pre-ignition window gradually increase. Further, as the engine continues to operate at higher engine speed between t2 and t3, peak values in the first, earlier segments steadily rise while a corresponding decrease in peak values is observed in third, later segments of the pre-ignition window (between t1 and t3).

As depicted by the dashed line 1017, peak values (e.g., peak heights) in the third, later segments of the pre-ignition window gradually diminish as the number of engine cycles increases between t1 and t3 while peak values in the first, earlier segments of the pre-ignition windows rise steadily as shown by dashed line 1013 between t1 and t3. Meanwhile, peak values in the second middle segments rise and then fall, as shown by dashed line 1015. Thus, peak values in the later segments of the pre-ignition windows may decrease as combustion events occur earlier in the engine cycles. Further, as combustion events transition towards an earlier timing of engine cycles, peak values in the earlier segments steadily increases. Responsive to the reduction in peak values in later segments and a concurrent increase in peak values in earlier segments, HSPI may be indicated. Specifically, the HSPI flag may be activated at t3 whereupon one or more mitigating actions may be initiated. For example, as depicted at t3, fueling of the cylinder may be terminated in response to the indication of HSPI. In addition, engine loads may be limited (not shown). Further, engine speed may also be limited by reducing intake air flow and/or by reducing fueling. Dashed section 1021 depicts a reduction in engine speed to that of the threshold speed (represented by line 1009) between t3 and t4 in response to engine speed limiting. HSPI may subside in response to the mitigating actions as indicated by the lower peak values in the sensor outputs between t3 and t4. Once HSPI is alleviated, fueling of the cylinder may be restored at t4. Further, the limit on engine speed and engine load may be removed. Accordingly, engine speed increases after t4.

One example engine system may comprise an engine cylinder, a knock sensor coupled to the engine cylinder, a direct fuel injector for injecting fuel into the cylinder, an intake throttle, and a controller configured with computer-readable instructions stored on non-transitory memory for measuring an output of the knock sensor in a first, later knock window over a first number of engine cycles, measuring the output of the knock sensor in a second, earlier pre-ignition window over a second number of engine cycles, integrating the output of the knock sensor in each of the first, later knock windows and the second, earlier pre-ignition windows, indicating pre-ignition based on the integrated output in the first, later knock window relative to the integrated output in the second, earlier pre-ignition window, and adjusting an opening of the intake throttle based on the indication. In the preceding example, the first number of engine cycles may additionally or optionally precede, or may be concurrent to, the second number of engine cycles. In any or all of the preceding examples, the indicating based on the integrated output may additionally or optionally include indicating high speed pre-ignition responsive to one of an increase in the integrated output in the first, later knock window followed by an increase in the integrated knock sensor output in the second, earlier pre-ignition window, and a decrease in a peak value of the output of the knock sensor in the first, later knock window with an increase in the peak value of the output of the knock sensor in the second, earlier pre-ignition window. In any or all of the preceding examples, the system may additionally or optionally further comprise a spark plug, wherein the indicating may be additionally or optionally further based on a change in spark timing of the cylinder, the indicating including indicating pre-ignition responsive to an increase in the integrated output in the pre-ignition window following the integrated output in the knock window exceeding a threshold and spark timing in the cylinder being retarded by a threshold amount.

Another example method for an engine may comprise indicating pre-ignition based on each of an integrated knock sensor output in a knock window and an integrated knock sensor output in a pre-ignition window. In the preceding example, the method may additionally or optionally further comprise, in response to the indication, disabling fuel injection to an affected cylinder for one or more combustion events, and then resuming fuel injection in the affected cylinder. In any or all of the preceding examples, the method may additionally or optionally include reducing an intake air flow to reduce an engine load for one or more combustion events in response to the indication, and then resuming the engine load. In any or all of the preceding examples, the knock sensor output in the knock window may additionally or optionally be compared to a lower threshold, while the knock sensor output in the pre-ignition window may be compared to a higher threshold. In any or all of the preceding examples, the integrated knock sensor output may additionally or optionally include an integrated knock sensor output value, and wherein the indicating additionally or optionally includes indicating pre-ignition based on a rise in the integrated knock sensor output value in the knock window followed by a rise in the integrated knock sensor output value in the pre-ignition window. In addition, in any or all of the preceding examples, the method may additionally or optionally include indicating pre-ignition based on peak values of knock sensor outputs in each of the knock window and the pre-ignition window, and wherein the indicating may include indicating pre-ignition based on a decrease in the peak values in the knock windows and an increase in the peak values in the pre-ignition windows. The indicating, herein, may be further based on a rate of change in the knock sensor output in the knock window relative to a rate of change of in the knock sensor output in the pre-ignition window. As such, knock sensor output may be integrated over a common number of engine cycles in each of the knock and pre-ignition window. Alternatively, the knock sensor output may be integrated over a different number of engine cycles in the knock window relative to the pre-ignition window. The knock window may be a crank angle window that is non-overlapping with the pre-ignition window (as shown in map 410 of FIG. 4). In another example, the knock window may be a crank angle window that is at least partially overlapping with the pre-ignition window (as depicted in map 430 and map 450 of FIG. 4). As shown in FIG. 5B and routine 700, the method may include dividing at least the pre-ignition window into a plurality of segments, the plurality of segments based on a degree of overlap between the knock and pre-ignition windows. Herein, the indicating may be based on a comparison of peak values of knock sensor output in each of the plurality of segments of the pre-ignition window over a plurality of engine cycles. As such, indicating pre-ignition may include indicating high speed pre-ignition.

In yet another example, a method for an engine may comprise indicating low speed pre-ignition based on knock sensor output assessed in each of a knock window and a pre-ignition window, and indicating high speed pre-ignition based on an integrated knock sensor output, integrated over a number of engine cycles, in each of the knock window and the pre-ignition window. In the preceding example, the method may additionally or optionally further comprise, in response to the indication of low speed pre-ignition, enriching an affected cylinder and reducing engine intake air flow by a first amount, and in response to the indication of high speed pre-ignition, deactivating fuel to the affected cylinder and reducing engine intake air flow by a second amount, the second amount higher than the first amount. In any or all of the preceding examples, the method may additionally or optionally further include, in response to the indication of low speed pre-ignition, the affected cylinder may be enriched for a first, smaller number of combustion events, and wherein in response to the indication of high speed pre-ignition, fuel may be deactivated in the affected cylinder for a second, larger number of combustion events.

In this way, high speed pre-ignition may be distinguished and mitigated. A technical effect of identifying and remedying high speed pre-ignition promptly is reducing issues such as runaway pre-ignition and associated engine degradation. High speed pre-ignition may be detected via one or more of analyzing changes in integrated knock sensor outputs in knock and pre-ignition windows as well as by evaluating changes in peak values of knock sensor outputs in knock and pre-ignition windows over a plurality of engine cycles. As such, high speed pre-ignition may be more accurately identified without corruption of knock sensor output from mechanical noise during higher engine speeds. Overall, engine durability and performance may be enhanced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:

indicating pre-ignition based on each of an integrated knock sensor output in a knock window and an integrated knock sensor output in a pre-ignition window; and responsive to pre-ignition, limiting engine load by reducing a boost level.

2. The method of claim 1, wherein the knock window and the pre-ignition window overlap in a first condition, and do not overlap in a second condition.

3. The method of claim 2, further comprising, in response to the indication of pre-ignition, disabling fuel injection to an affected cylinder for one or more combustion events, and then resuming fuel injection in the affected cylinder.

4. The method of claim 1, further comprising, in response to the indicating, reducing an intake air flow only for one or more combustion events, and then resuming the intake air flow.

5. The method of claim 1, wherein the knock sensor output in the knock window is compared to a lower threshold, while the knock sensor output in the pre-ignition window is compared to a higher threshold.

6. The method of claim 2, wherein the integrated knock sensor output includes an integrated knock sensor output value, and wherein the indicating includes indicating pre-ignition based on a rise in the integrated knock sensor output value in the knock window followed by a rise in the integrated knock sensor output value in the pre-ignition window.

7. The method of claim 1, further comprising indicating pre-ignition based on peak values of knock sensor outputs in each of the knock window and the pre-ignition window, and wherein the indicating includes indicating pre-ignition based on a decrease in the peak value in the knock window and an increase in the peak value in the pre-ignition window.

8. The method of claim 7, wherein the indicating is further based on a rate of change in the knock sensor output in the knock window relative to a rate of change in the knock sensor output in the pre-ignition window.

9. The method of claim 2, wherein the knock sensor output is integrated over a common number of engine cycles in each of the knock window and the pre-ignition window.

10. The method of claim 1, wherein the knock sensor output is integrated over a different number of engine cycles in the knock window relative to the pre-ignition window.

11. The method of claim 2, wherein the knock window only partially overlaps with the pre-ignition window in the first condition.

12. The method of claim 10, wherein at least the pre-ignition window is divided into a plurality of segments, the plurality of segments based on one or more of a degree of overlap between the knock window and the pre-ignition window, engine speed, engine load, and spark timing, and wherein the indicating is based on a comparison of peak values of knock sensor output in each of the plurality of segments of the pre-ignition window.

13. The method of claim 1, wherein indicating pre-ignition includes indicating high speed pre-ignition.

14. A method for an engine, comprising:

indicating low speed pre-ignition based on knock sensor output assessed in each of a knock window and a pre-ignition window;

indicating high speed pre-ignition based on an integrated knock sensor output, integrated over a number of engine cycles, in each of the knock window and the pre-ignition window; and limiting engine load responsive to the low speed pre-ignition.

15. The method of claim 14, further comprising, in response to the indication of low speed pre-ignition, enriching an affected cylinder and reducing engine intake air flow by a first amount, and in response to the indication of high speed pre-ignition, deactivating fuel to the affected cylinder and reducing engine intake air flow by a second amount, the second amount higher than the first amount, the reducing of engine intake air flow limiting engine speed and engine load.

16. The method of claim 15, wherein, in response to the indication of low speed pre-ignition, the affected cylinder is enriched for a first, smaller number of combustion events, and wherein, in response to the indication of high speed pre-ignition, fuel is deactivated in the affected cylinder for a second, larger number of combustion events.

* * * * *